United States Patent [19]
Kobayashi

[11] Patent Number: 5,533,003
[45] Date of Patent: Jul. 2, 1996

[54] RECORDING DEVICE CAPABLE OF DETECTING THE CHANGE IN LENGTH AND POSITION OF THE PIT EDGE

[75] Inventor: Seiji Kobayashi, Kanagawa, Japan

[73] Assignee: Sony Corporation, Tokyo, Japan

[21] Appl. No.: 262,821

[22] Filed: Jun. 21, 1994

[30] Foreign Application Priority Data

Jun. 28, 1993 [JP] Japan .................................. 5-156417

[51] Int. Cl.⁶ ........................................................ G11B 7/24
[52] U.S. Cl. ........................................ 369/275.4; 369/58
[58] Field of Search ............................. 369/275.4, 275.3, 369/44.26, 116, 124, 54, 58, 59, 275.1, 14

[56] References Cited

U.S. PATENT DOCUMENTS

| | | | |
|---|---|---|---|
| 4,873,680 | 10/1989 | Chung et al. .............................. | 369/59 |
| 5,345,434 | 9/1994 | Ide et al. .................................... | 369/58 |
| 5,347,505 | 9/1994 | Moritsugu et al. ....................... | 369/59 |
| 5,414,689 | 5/1995 | Maeda et al. .............................. | 369/59 |
| 5,418,770 | 5/1995 | Ide et al. .................................... | 369/116 |
| 5,422,865 | 6/1995 | Katayama et al. ...................... | 369/116 |

*Primary Examiner*—Tan Dinh
*Attorney, Agent, or Firm*—Limbach & Limbach

[57] ABSTRACT

In an information recording medium having a plurality of regularly spaced pits that alternate between data pits and servo pits, digital data is recorded onto the medium by varying the position of the edges of the pits. In accordance with the present invention, servo data is distinguished from user data by locating the edges of an adjacent pair of servo pits in a position which is unavailable to the data pits. In addition, an information recording medium reproducing apparatus is also disclosed.

16 Claims, 22 Drawing Sheets

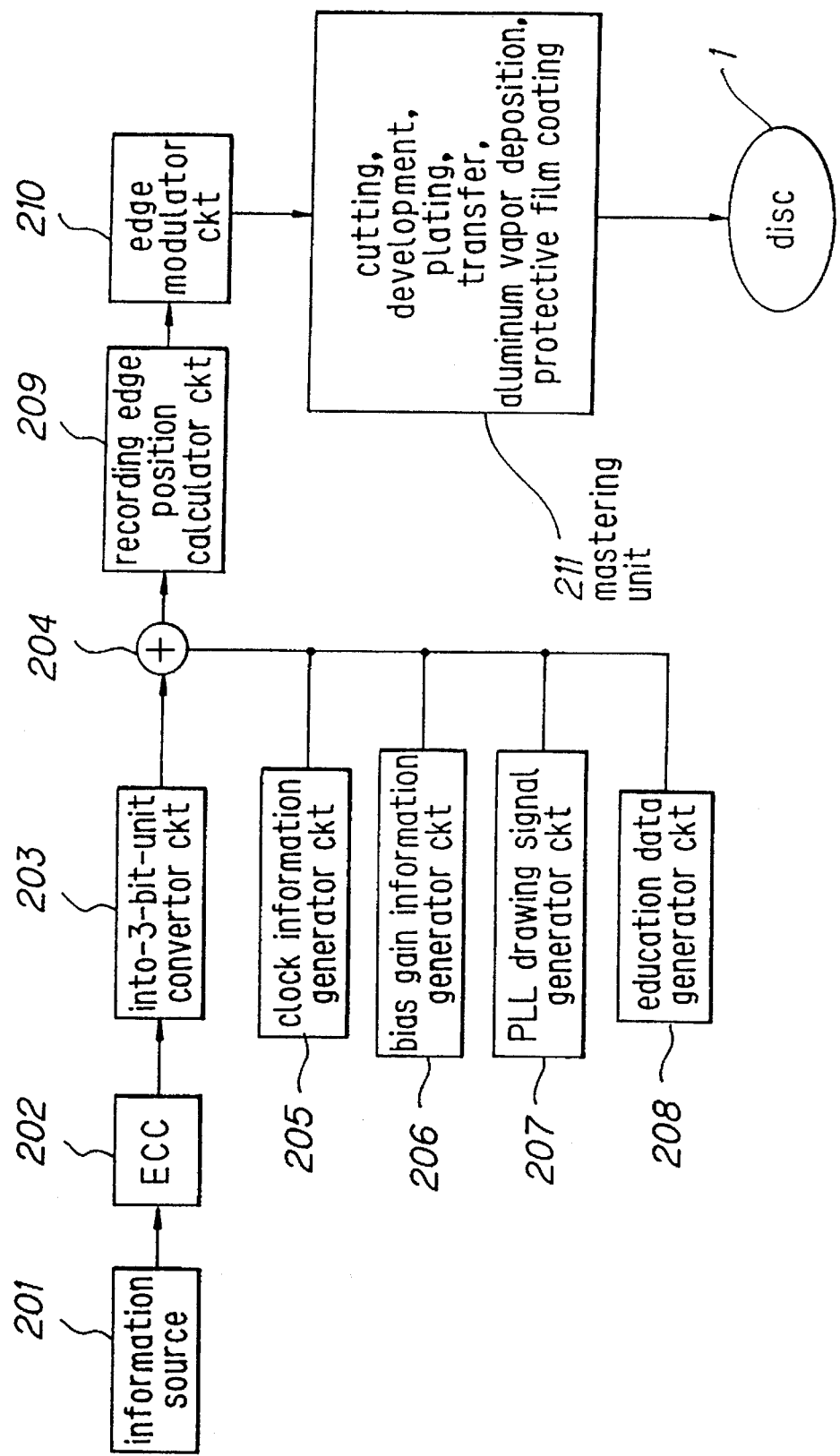

RECORDING DEVICE CAPABLE OF DETECTING THE CHANGE IN LENGTH AND POSITION OF THE PIT EDGE

BACKGROUND OF THE INVENTION

1. Field of the Invention

The present invention relates to an information recording medium, for example, such as an optical disc, a photo-electro-magnetic disc or the like, and also to an information recording medium reproducing apparatus for reproducing information from the information recording medium.

2. Discussion of the Related Art

In a conventional optical disc used in a CAV (constant angular velocity) mode, a servo byte interval is periodically provided at a predetermined position of each track so that clock pits for generation of reference clocks and wobbled pits for tracking are formed in the servo byte interval. Reference clocks (channel clocks) are generated in correspondence with the clock pits, and information is digitally recorded by pits having a length which is integral number times as long as a period of the reference clock.

On the other hand, for example, in a system used in a CLV (constant linear velocity), for example, such as a CD (compact disc), there is no clock pit, but, a length of recorded pits and an interval of the pits are selected (the so-called self-clock system) so as to have lengths (in the CD, nine kinds of lengths ranging from approximately 0.9 µm to 3.3 µm) which are integral number times as long as a period (0.3 µm) of the reference clock (channel clock). The clock components contained in a reproduced RF signal are extracted therefrom, and recorded information is cut into bit units.

By the way, in the video disc which constitutes the same optical disc, a video signal is modulated by a difference in the length of the pit which is finer by far than that of the CD, recorded and reproduced. Now, this will be described with reference to an example of a signal recorded at a portion of a radius 55 mm in the CAV mode. In the video disc, the brightest portion in the video signal is recorded as a signal of 9.3 MHz whereas the darkest portion therein is recorded as a signal of 7.6 MHz. On a disc having a radius of 55 mm, the former corresponds to 1.075 µm whereas the latter corresponds to 1.316 µm. There is well known such a fact that a fine image can be reproduced when the disc on which the signals have been thus recorded is reproduced.

If a change in brightness of 128 gradations can be expressed, it is meant that the period of pits is changed finely by 128 steps or more on the disc, recorded and reproduced. That is, a change in the fine pit length and the pit distance represented by the following expression is reflected on the video signal.

(1.316 µm−1.075 µm)÷128=0.002 vm

In spite of the fact that such a fine change in length of the pit can be recorded, the reason why the minimum unit of the change in the length of the pit must be enlarged to 0.3 µm is mainly because the recording/reproducing method is not optimum.

Applicant(s) has previously proposed in Japanese Patent application No. Hei 3-167585 that the position of the front edge or the rear edge of an information pit is shifted from a predetermined reference position in correspondence with recording information step-by-step to record digital information. According to this recording/reproducing method, as the change in length of the pits and position of a pit edge can be detected with very high accuracy, it is possible to record digital information with a minute change which has been heretofore considered impossible. As a result, it can be realized to make the density higher than till now.

FIGS. 23(a) to 23(c) show a principle of recording information by shifting the position of the edge step-by-step as previously proposed by Applicant(s). As shown in the figures, a recording signal (FIG. 23(B)) which has been subjected to PWM modulation is generated in correspondence with recording data. Then, a pit (FIG. 23(A) corresponding to the length of the recording signal at the time of zero-cross is formed. In this manner, the position of the pit edge is changed step-by-step from a position represented by a reference clock (FIG. 23(C)). In response to the amount of this change, data of 8 gradations (3 bits) ranging from 0 to 7 can be recorded.

FIGS. 24(A) to 24(D) show a principle of reproducing the signal thus recorded. An RF signal (FIG. 24(A)) reproduced by the information recording medium is largely amplified to obtain a binary coded RF signal (FIG. 24(B)). Because the clock pits are in the disc on which information has been recorded, reference clock signals (FIG. 24(C)) are produced on the basis of the clock pits, and saw-tooth wave signals (FIG. 24(D)) are further produced in synchronism with the reference clock signals. Then, the position of the edge of the information pit is detected by detecting a timing at which the saw-tooth wave signals and the binary coded RF signals cross.

Thus, in the case where the position of the pit edge is changed step-by-step in correspondence with the recording data, the clock signal with high accuracy is required as a base of reproduction.

For example, as described above, because of using the self-clock system, all edges of the pits come to have the clock information. As a result, the clock information is recorded on the disc at short intervals, and therefore the clock signal can be readily produced from a clock component contained in the reproduced signal by a PLL circuit. Consequently, in this case, a loop band can be broadened, and even in the case where the rotational speed of the disc is shifted by a relatively large amount from a regular value, the PLL can be locked. For that reason, for example, a spindle motor is rotated by applying a predetermined voltage or the like, and subsequently a PLL circuit is operated. Thereafter, a signal produced by the PLL circuit is used for adjusting the rotational speed of the spindle motor with accuracy.

However, as in the case of the fore-mentioned proposal, in the system where the position of the pit edge is shifted step-by-step in correspondence with the recording data, because the edge has no clock information, clock data is necessary to be recorded separately in a predetermined area on the track.

If a recording interval of the clock data is shortened, as mentioned above, the PLL band for generating the clock signal can be further broadened, and this is advantageous in view of clock generation. However, if the recording interval of the clock data is made narrow, a data region where essential data is recorded and/or reproduced is reduced as much, thereby lowering a recording capacity of the disc. That is, even though the interval at which the clock data is recorded is made narrow, there is a limit thereof in view of the practical recording capacity of the disc.

As a result, the sampling frequency (inverse number of a period) of the clock data in the system in which the position of the pit edge is shifted step-by-step in correspondence with the recording data comes to be lowered by the degree of one digit in comparison with that of a CD. For that reason, it is necessary to make the frequency band of the PLL circuit narrow, with the result that a capture range of the PLL circuit (drawable frequency range) is made narrow. Consequently, to generate the clock signal by using the PLL circuit, it is necessary to accurately adjust the rotational speed of the disc to a predetermined rotational speed which has been previously set.

SUMMARY OF THE INVENTION

The present invention has been made in view of the above-mentioned circumstances, and an object of the invention is to provide an information recording medium and a recording apparatus therefor capable of readily reproducing clock signals.

In order to solve the above-mentioned problems, the present invention has been achieved by provision of an information recording medium in which pits are recorded every constant period, and at least one position of a front edge or a rear edge of the pits is modulated in correspondence with recording data so as to be changed step-by-step, characterized in that at least one edge of the pit is located in correspondence with synchronous data in a predetermined period at a position different from that in the case of modulation by the recording data.

The edge the position of which is changed in correspondence with the synchronous data may be opposed edges of two adjacent pits. Further, an edge corresponding to predetermined constant recording data may be disposed at a position apart by a given distance from the edge corresponding to the synchronous data.

Further, according to the invention, there is provided an information recording medium reproducing apparatus for reproducing an information recording medium in which pits are disposed every constant period, at least one position of a front edge or a rear edge of data pits among the pits is modulated in correspondence with the recording data so as to be changed step-by-step, an edge position of synchronous pits among the pits is disposed in a predetermined period in correspondence with synchronous data at a position different from that in the case of modulation by the recording data, and an edge position of a reference pit disposed at a position apart by a constant distance from the synchronous pits among the pits is disposed at a position corresponding to a predetermined constant recording data, the reproducing apparatus comprising: a pickup which constitutes reproduction means for reproducing a disc which constitutes an information recording medium; an A/D converter circuit which constitutes level detection means for detecting levels corresponding to the synchronous pit and the reference pit of a reproduced signal outputted from the pickup; flip-flops; and a maximum value detection circuit which constitutes timing detection means for detecting a timing corresponding to the edge of the synchronous pit on the basis of the level corresponding to the synchronous pit and the level corresponding to the reference pit.

Further, according to the invention, there is provided an information recording medium reproducing apparatus for reproducing an information recording medium in which pits are disposed every constant period, at least one position of a front edge or a rear edge of data pits among the pits is modulated in correspondence with recording data so as to be changed step-by-step, and an edge position of synchronous pits among the pits is disposed in a predetermined period in correspondence with synchronous data at a position different from that in a case of modulation by the recording data, the reproducing apparatus comprising: a pickup which constitutes reproduction means for reproducing a disc which constitutes the information recording medium; a band pass filter which constitutes generation means for extracting a component of a frequency corresponding to a constant period of the pit from a reproduced signal outputted from the pickup to generate a clock signal; a zero-cross comparator; a mono-multiple comparator; a mono-multiple vibrator; an A/D conversion circuit which constitutes level detection means for detecting levels corresponding to the synchronous pit of the reproduced signal outputted from the pickup by use of a clock signal generated by the mono-multiple vibrator; and a maximum value detection circuit which constitutes timing detection means for detecting a timing corresponding to the edge of the synchronous pit on the basis of the level corresponding to the synchronous pit detected by the A/D conversion circuit.

Further, according to the invention, there is provided an information recording medium reproducing apparatus for reproducing an information recording medium in which pits are disposed every constant period, at least one position of a front edge or a rear edge of data pits among the pits is modulated in correspondence with recording data so as to be changed step-by-step, and a position of an edge of synchronous pits among the pits is disposed in a predetermined period in correspondence with synchronous data at a position different from that in a case of modulation by the recording data, the reproducing apparatus comprising: a pickup which constitutes reproduction means for reproducing a disc which constitutes the information recording medium; an A/D converter circuit which constitutes level detection means for detecting a level corresponding to the synchronous pit of a reproduced signal outputted from the pickup; a comparator which constitutes comparator means for comparing a level corresponding to the synchronous pit detected by the A/D conversion circuit with a predetermined reference value to output a timing signal corresponding to the edge of the synchronous pit; and a comparator reference level generation circuit which constitutes control means for controlling a reference value of the comparator so that a frequency of the timing signal corresponding to the edge of the synchronous pit is set to a predetermined frequency.

These information recording medium reproducing apparatus may further comprise two binary coding circuits which constitute binary coding means for binary-coding a reproduced RF signal outputted from the pickup; two frequency-to-voltage conversion circuit which constitute frequency-to-voltage conversion means for subjecting output signals of the binary coding circuits to frequency-to-voltage conversion; and a substracter which constitutes a rotation control means for controlling the rotational movement of the disc so that output signals of the frequency-to-voltage conversion circuits are set to predetermined values, respectively.

Also, there may be provided a band pass filter which constitutes extraction means for extracting a frequency component corresponding to a constant period of the pits from the reproduced RF signal outputted from the pickup to supply the extracted frequency component to one of the binary coding circuits.

Further, there may be provided a phase difference detection circuit which constitutes phase comparison means for comparing a phase of a signal outputted from the band pass filter with a phase of a predetermined reference signal to output a signal for controlling the rotational movement of the disc according to a comparison result.

According to the invention, in the information recording medium, at least one edge of the pits is disposed at a position different from that in a case of modulation by the recording data in a predetermined period in correspondence with the synchronous data. Therefore, a clock signal on the basis of which recording and reproduction are performed can be readily produced by detecting the edge.

Further, in the information recording medium reproducing apparatus according to the invention, a timing corresponding to the edge of the synchronous pit is detected, for example, according to a difference in the reproduced level between the synchronous pit and the reference pit. Therefore, the timing of the synchronous pit can be detected with accuracy without any influence of the reflectance and the transmittance of the disc.

Further, in the information recording medium reproducing apparatus according to the invention, the frequency component corresponding to the constant period of the pits is extracted, and the clock signal is produced from the extracted signal. Then, the level corresponding to synchronous pit is detected using the clock signal. Therefore, even in such a state where the rotational movement of the disc is shifted from a regular speed by a relatively large amount, the synchronous pit can be detected with accuracy.

Further, in the information recording medium reproducing apparatus, the reference value is automatically controlled so that the frequency of the timing signal corresponding to the edge of the synchronous pit is set to the predetermined frequency. As a result, the synchronous pit can be detected with accuracy without any influence of dispersion of the characteristics of the disc or the like.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

FIG. 22 is a block diagram showing a structure of a device for manufacturing the optical disc;

DETAILED DESCRIPTION OF THE PREFERRED EMBODIMENTS

Figure 1:
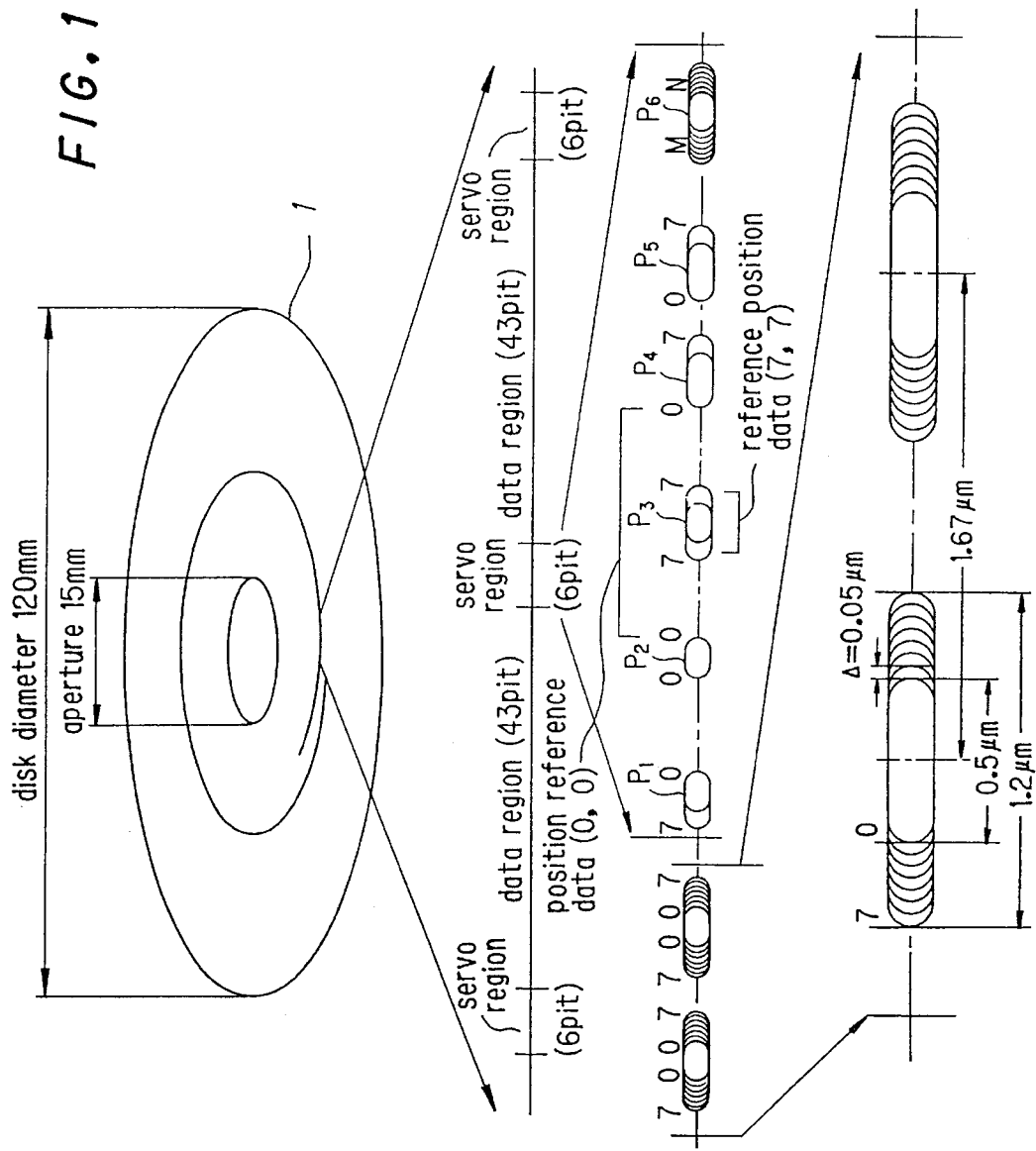
FIG. 1 is a diagram showing a format of a servo region in an optical disc to which an information recording medium of the present invention is applied.

Hereinafter, embodiments of the present invention will be described with reference to the accompanying drawings:

FIG. 1 shows an example of a fundamental format of an optical disc to which an information recording medium of the present invention is applied.

In this embodiment, in a reflective type optical disc 1 having a diameter of 120 mm (pits are formed on a reflecting surface of an optical beam in the form of physical concaves or convexs), a pit string is recorded at a track pitch of 1.6 μm in the CLV mode. All information is recorded as a shift quantity of eight steps of edge positions of a front edge (rise) and a rear edge (fall) of a pit arranged every constant period of 1.67 μm. A unit shift quantity Δ which constitutes one unit of this shift quantity is set to 0.05 μm.

Since the respective three-bit digital information can be recorded by the eight-step shift quantity of the edge positions of each pit thus arranged, a line recording information density in a direction of a pit string is 0.28 μm/bit which is more than twice as high as that of the current CD system.

In the CD system, even in the case where a linear velocity is 1.2 m/s of an upper limit, data bits of eight bits to be recorded are modulated into channel bits of 17 bits in total consisting of information bits of 14 bits and margin bits of 3 bits by the EFM modulation (Eight to Fourteen Modulation), and then are recorded in the pits on the disc. Therefore, taking the EFM modulation into consideration, the linear recording information density is approximately 0.6 μm/bit. That is, since the shortest pit of approximately 0.9 μm corresponds to the channel bit having three-bit quantity, the linear recording information density is represented as follows:

$$(0.9 \div 3) \times (17 \div 8) \approx 0.6 \text{ μm/bit}$$

Here, as shown in FIGS. 2A–2C, the edge position of the pit recorded on the optical disc 1 is shifted from a reference position of the center of the pit step-by-step in accordance with digital information to be recorded. A shift period Ts (=Δ×7) is set within a range corresponding to a period shorter than a rise period tr or a fall period tf which is a transition period (a period except for a stationary state of a 0 level or a saturated level) of the RF signal (a reproduced signal) determined in accordance with the transfer characteristics of an optical detecting system.

The RF signal is outputted from a pickup 3 of a reproducing apparatus which will be described later, and the transition period is determined in accordance with the transfer characteristics of the pickup 3. In general, the transfer characteristics of an optical system is regulated by an MTF (modulation transfer function) which is an absolute value of the transfer function (OTF: optical transfer function), and the MTF is determined depending upon a numerical aperture NA of a lens and a wavelength λ of a laser.

If the unit shift quantity Δ is shifted by a unit quantity still smaller than 0.05 μm during the shift period Ts, the change of, for example, sixteen steps can be recorded on the pit edge. Because information of four bits can be represented by sixteen steps, the recording density can be further enhanced.

At the reference position of the center of the pits thus recorded, the reproduced levels L0 to L7 corresponding to the shift quantity 0 to 7 of the edge position of the pit can be obtained by subjecting the RF signal to A/D conversion at the timing of, for example, the rise edge of the phase-synchronous sample clock signal SP. Thus, in the transition period tr or tf of the RF signal, the condition where the reproduced levels L0 to L7 can be detected by only one sampling is satisfied by:

shift period Ts ≦ transition period (rise period tr or fall period tf)

Here, it is preferable that the sampling timing by the sample clock signal SP is a timing corresponding to the center of the shift period Ts, and with this timing, the reproduced level can be detected over the entire range of the transition period of the RF signal.

Further, in this embodiment, the disc 1 is constituted by a so-called reflective type optical disc in which the pits are formed on the reflecting surface of the light beam in the form of the physical concaves or convexes. However, the present invention can be also applied to a so-called MO (magneto optical) disc (photo-magnetic disc) in which pits (marks) are formed by partially inverting the magnetization of a photo-magnetic film, or the like.

Figure 3:
FIG. 3 is a diagram showing an enlarged state in which an edge of a pit is changed step-by-step according to the embodiment of FIG. 1.

The digital information recorded on the optical disc 1 is cut into three-bit units, and recorded in the n-th pit as recording data an and bn. FIG. 3 shows a state where the front edge of the pit is set to any of eight shift positions of from 0 to 7 in accordance with the recording data an. Likewise, the position of the rear edge is set to any of eight shift positions of 0 to 7 in accordance with the recording data bn. The pitch A of the respective shift positions is 0.05 μm as mentioned above. As a result, each pit comes to have the shortest length LP=0.5 μm when the recording data an and bn is formed on the edge of the shift position 0.

Returning to FIG. 1 again, in the optical disc 1, between the data region consisting of 43 data pits formed in correspondence with the recording data and other data regions, a servo region consisting of six servo bits P1 to P6 for servo is inserted. Among six pits recorded in the servo region, the pit P6 is an education pit whereas the pits P0 to P5 are reference pits. A front edge of the education pit P6 at the left side of the figure is set to a position M of any of eight step shift positions of 0 to 7, and a rear edge thereof at the right side of the figure is also set to a position N of any of eight step shift positions of 0 to 7.

The combination of the position M of the front edge and the position N of the rear edge of the education pit P6 are set regularly in each of the servo regions so that the servo regions have a different combination thereof, respectively. That is, M and N are (0,0) in an initial servo region, and (0,1) in a succeeding servo region. Similarly, the combination of the positions M and N are set regularly such as (0,2), (0,3), . . . (7,6), (7,7). Consequently, in the 64 (=8×8) servo regions, there comes to prepare all possible different combinations of the front and rear edge positions of the education pit P6.

The reference pits P2 to P4 are pits for obtaining data of reference positions (0,0) and (7,7). The reference position data can be logically formed, for example, on both edges of the pit P1. However, in such a case, because the rate of interference of the adjacent data regions with the reference pit is changed in accordance with the recording data, it is preferable that the reference position data is formed in the pits P2 to P4 between the dummy reference pits P1 and P5 (their data is always fixed) as in the embodiment.

Figure 4:
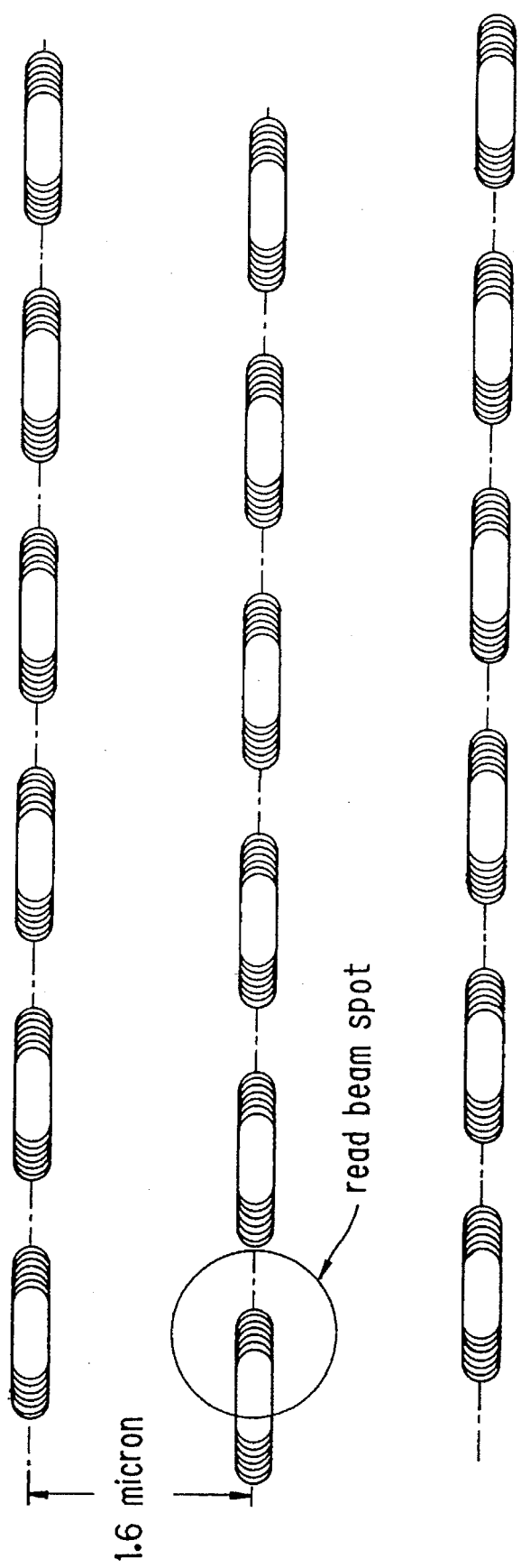
FIG. 4 is a diagram showing a pit array state on adjacent tracks in the case where an optical disc shown in FIG. 1 is a CLV disc.

FIG. 4 is a diagram used for briefly explaining the plan structure of the optical disc 1. Since a signal recorded at a track pitch of 1.6 μm is recorded in the CLV mode, the pit positions between the adjacent tracks are out of phase, and as shown in the figure, the pits are recorded on the disc at a disordered phase.

Figure 5:
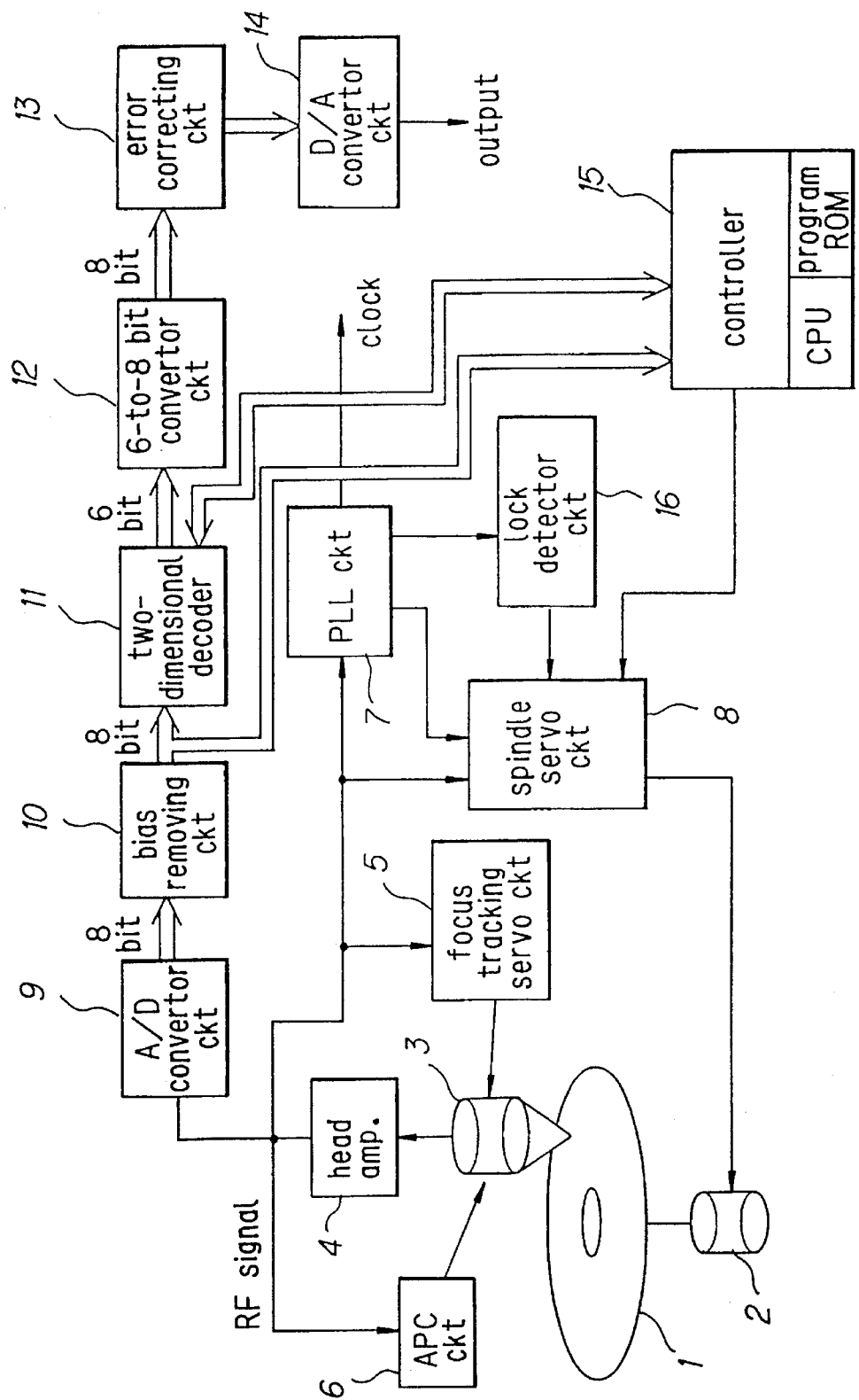
FIG. 5 is a block diagram showing an optical disc reproducing apparatus to which the information recording medium reproducing apparatus of the invention is applied according to one embodiment.

FIG. 5 is a block diagram showing a structure of an optical disc reproducing apparatus to which the information recording medium reproducing apparatus of the present invention is applied in accordance with an embodiment of the invention. An optical disc 1 is disposed so as to be rotated by a spindle motor 2. In the optical disc 1, digital information is recorded on the basis of the principle shown in FIGS. 1 and 2. That is, at least one position of the front and rear edges of the pit is shifted from a predetermined reference position step-by-step so as to record the digital information. Then, the servo regions are formed on the optical disc 1 in a constant period, and the reference pits P1 to P5 and the education pit P6 are formed in the servo region. The data pits are originally formed in the data region.

The pickup 3 applies a laser beam to the optical disc to reproduce a signal recorded on the optical disc 1 from the reflected light. The RF signal outputted from the pickup 3 is amplified by a head amplifier 4 and then supplied to a focus tracking servo circuit 5, an APC circuit 6, a PLL circuit 7 and a spindle servo circuit 8.

The focus tracking servo circuit 5 generates a focus error signal and a tracking error signal from an input signal to execute focus control operation and tracking control operation on the basis of the error signals. The APC circuit 6 subjects the optical disc 1 to servo control so that the power of a laser beam applied to the optical disc 1 is kept constant.

The PLL circuit 7 is provided to extract the clock component from the input signal. The PLL circuit used in the ordinary CD system or the like reproduces the clock signal by use of all the RF signals, but in this embodiment, reproduces the clock signal by use of only the RF signal in the servo region. That is, since the servo region is not modulated by the recording data, a stable clock signal can be reproduced without any influence of the recording data. The details will be described later.

The spindle servo circuit 8 controls the spindle motor 2 so that the optical disc 1 rotates at a constant linear velocity, the details of which will be described later.

On the other hand, the RF signal outputted from the head amplifier 4 is inputted to an A/D converter circuit 9 so as to be A/D converted into digital data (reproduced level) representative of 256 levels of eight bits at a rise timing of the sample clock signal SP. After this eight-bit data is supplied to a bias removing circuit 10 so that a bias component is removed by the bias removing circuit 10, it is supplied to a two-dimensional decoder 11 and a controller 15. The controller 15 includes a CPU for executing various operation and a program ROM for storing programs to be executed by the CPU, and the like, and executes a mapping process and the like required in the two-dimensional decoder 11.

The two-dimensional decoder 11 decodes a signal supplied from the bias removing circuit 10, and outputs a signal to a 6–8 bit convertor circuit 12. After the 6–8 bit converter circuit 12 stores four pairs of six-bit data, the circuit 12 converts the data into three pairs of eight-bit data, and then outputs it to an error correcting circuit 13. The error correcting circuit 13 corrects an error of input data, and thereafter outputs a signal to a D/A converter circuit 14. The D/A converter circuit 14 converts input data into an analog signal, and then outputs the signal to, for example, an analog audio amplifier which is not shown.

Figure 6:
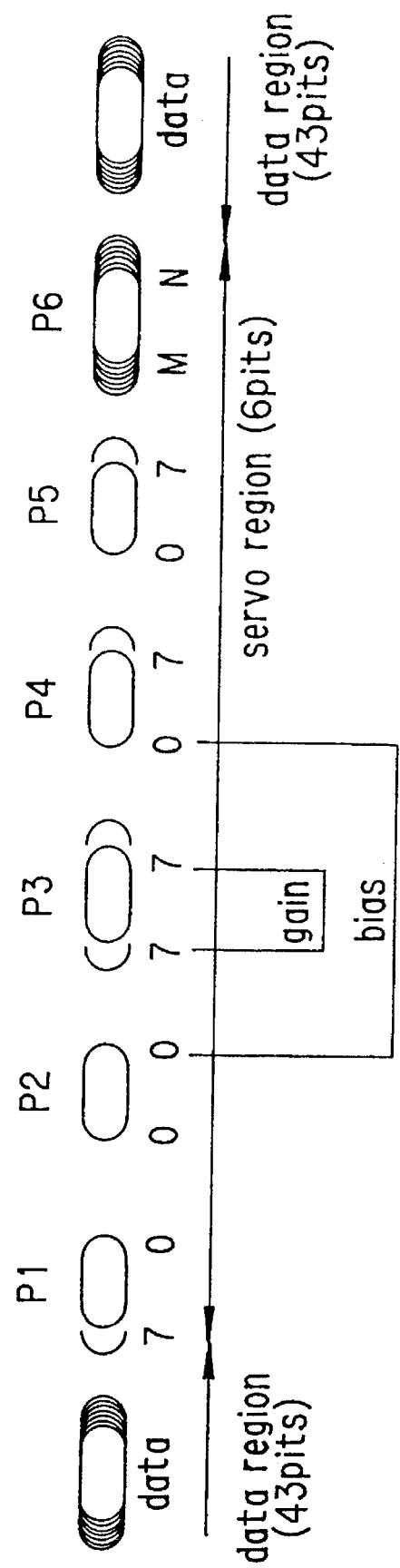
FIG. 6 is a diagram showing an enlarged pit of a servo region recorded in an optical disc of FIG. 5.

Here, the operation of the bias removing circuit 10 and the two-dimensional decoder 11 will be described briefly. As enlarged and shown in FIG. 6, the bias removing circuit 10 is to subtract a reproduced level of a combination (0,0) of a rear edge of the reference pit P2 and a front edge of the reference pit P4 from reproduced levels of the respective data pits. As a result, the fluctuation of the d.c. component can offset.

Further, the two-dimensional decoder 11 is to plot a point regulated by the reproduced levels of a pair of edges an and bn of a data bit (refer to FIG. 3), respectively on a two-dimensional plane to decode these values (0,0), (0,1), ..., (7,7). On the two-dimensional plane, 64 pairs of data (0,0), (0,1), ..., (7,7) obtained by reproducing the education pits P6 are mapped as points. The reproduced data is decoded as data corresponding to the nearest point (an education data point) on the two-dimensional plane.

Figure 7:
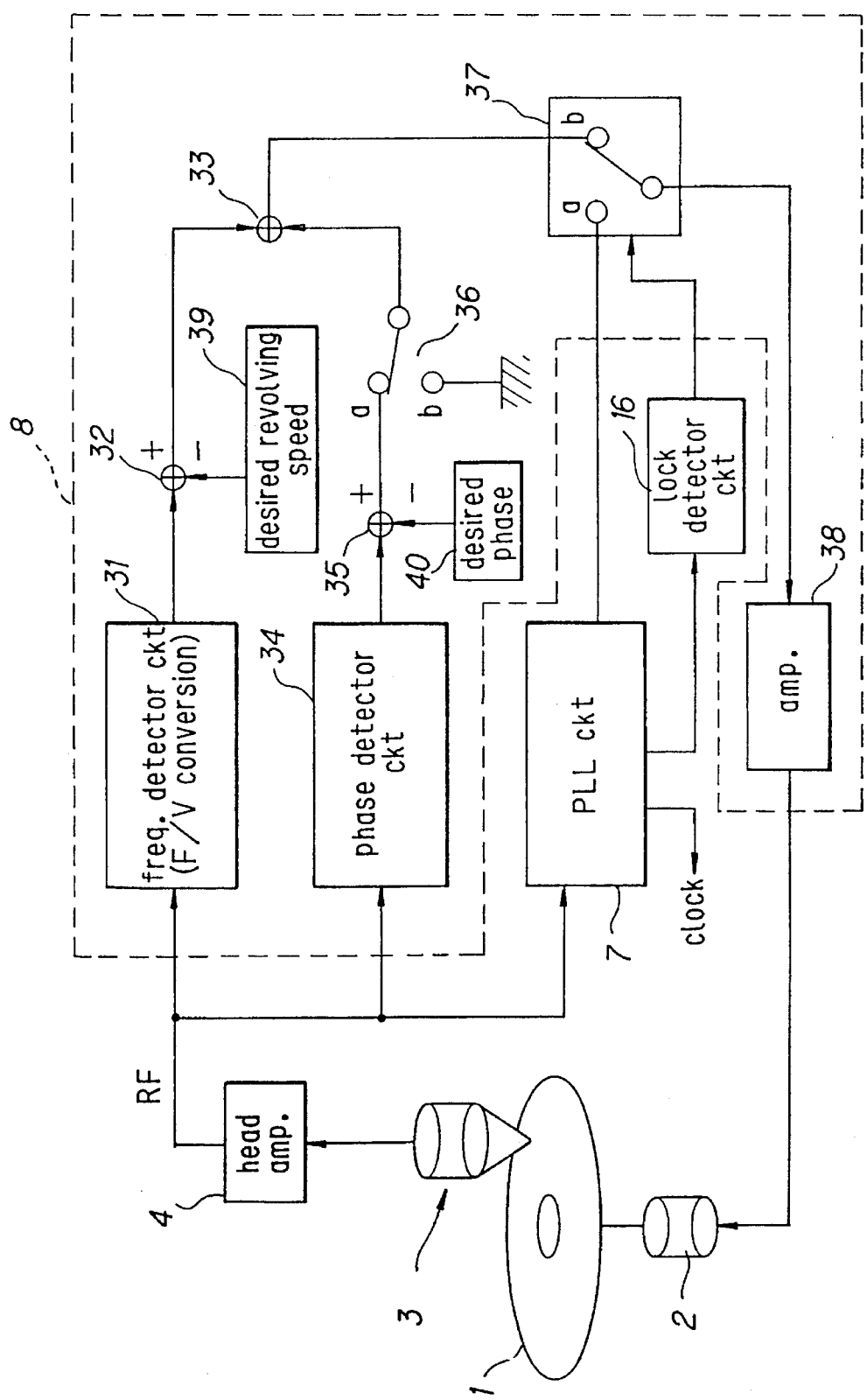
FIG. 7 is a block diagram showing an exemplary structure of a spindle servo circuit in the embodiment of FIG. 5.

FIG. 7 shows a structural example of the spindle servo circuit 8. When starting of the optical disc 1 is instructed, the controller 15 (FIG. 5) switches a switch 37 of the spindle servo circuit 8 over to a contact b side. The spindle motor 2 is driven through an amplifier 38, thereby to allow the rotation of the optical disc 1 to start. The pickup 3 reproduces the pits recorded on the optical disc 1, and outputs a reproduced RF signal. The head amplifier 4 amplifies the RF signal and supplies it to a frequency detector circuit (frequency-to-voltage converter circuit) 31.

The frequency detector circuit 31 converts a frequency of the input RF signal into voltage, and outputs voltage of a value corresponding to the frequency. As described above, the pits are formed on the optical disc 1 in the constant period (interval of 1.67 μm), and when the rotational speed of the optical disc 1 attains a regular speed, its frequency comes to 720 kHz. In the case where the rotational speed of the optical disc 1 is slow, its frequency becomes a value smaller than 720 kHz. Therefore, voltage outputted from the frequency detector circuit 31 is also small.

A subtracter 32 subtracts voltage outputted from a generator circuit 31 for generating voltage corresponding to a desired rotational speed from voltage supplied from the frequency detector circuit 31, and outputs its error voltage. Immediately after starting, because a switch 36 is switched over to the contact b side, its output voltage is nearly zero. Therefore, the output signal of the subtracter 32 is supplied from the contact b of the switch 37 through an adder 33 to the amplifier 38 so that the spindle motor 2 is driven in correspondence with this voltage. Because the optical disc 1 has not yet attained the desired rotational speed, the output voltage of the subtracter 32 becomes a relatively large value. For that reason, the spindle motor 2 drives the optical disc 1 so as to rotate the latter 1 at a higher speed.

When the rotational speed of the optical disc 1 is gradually increased in this way, thereby to attain a value close to the reference speed, the switch 36 is switched over to a contact a side. As a result, a phase servo loop is added to the above-mentioned so-called frequency servo loop.

That is, the phase detector circuit 34 compares the phase of the RF signal outputted from the head amplifier 4 with that of the predetermined reference signal, thereby to output its phase error signal. A subtracter 35 subtracts a signal outputted from a generator circuit 40 for generating a signal corresponding to a desired phase from the error signal. The signal outputted from the subtracter 35 is supplied to an adder 33 through a contact point a of the switch 36 so as to be added to the error signal of the frequency servo loop outputted from the subtracter 32. Therefore, since then, the rotation of the optical disc 1 is controlled by the servo operations of both the frequency servo loop and the phase servo loop.

The frequency voltage conversion generally has a dependency on a temperature, and when the circumferential temperature is changed, an output voltage is changed even though the same frequency is inputted. Therefore, by thus executing the phase servo, the rotational speed can be controlled with higher accuracy.

On the other hand, the PLL circuit 7 extracts a clock component from the RF signal outputted from the head amplifier 4, and generates a system clock signal synchronous with the clock component to output the system clock signal to a not-shown circuit. A lock detector circuit 16 detects whether the PLL circuit 7 is locked or not on the basis of the output signal of the PLL circuit 7. When detecting that the PLL circuit 7 is locked, the switch 37 is switched over to the contact a side directly or through the controller 15. Therefore, since then, the rotation of the optical disc 1 is controlled so that the clock signal generated by the PLL circuit 7 has a regular frequency and a regular phase.

Figure 8:
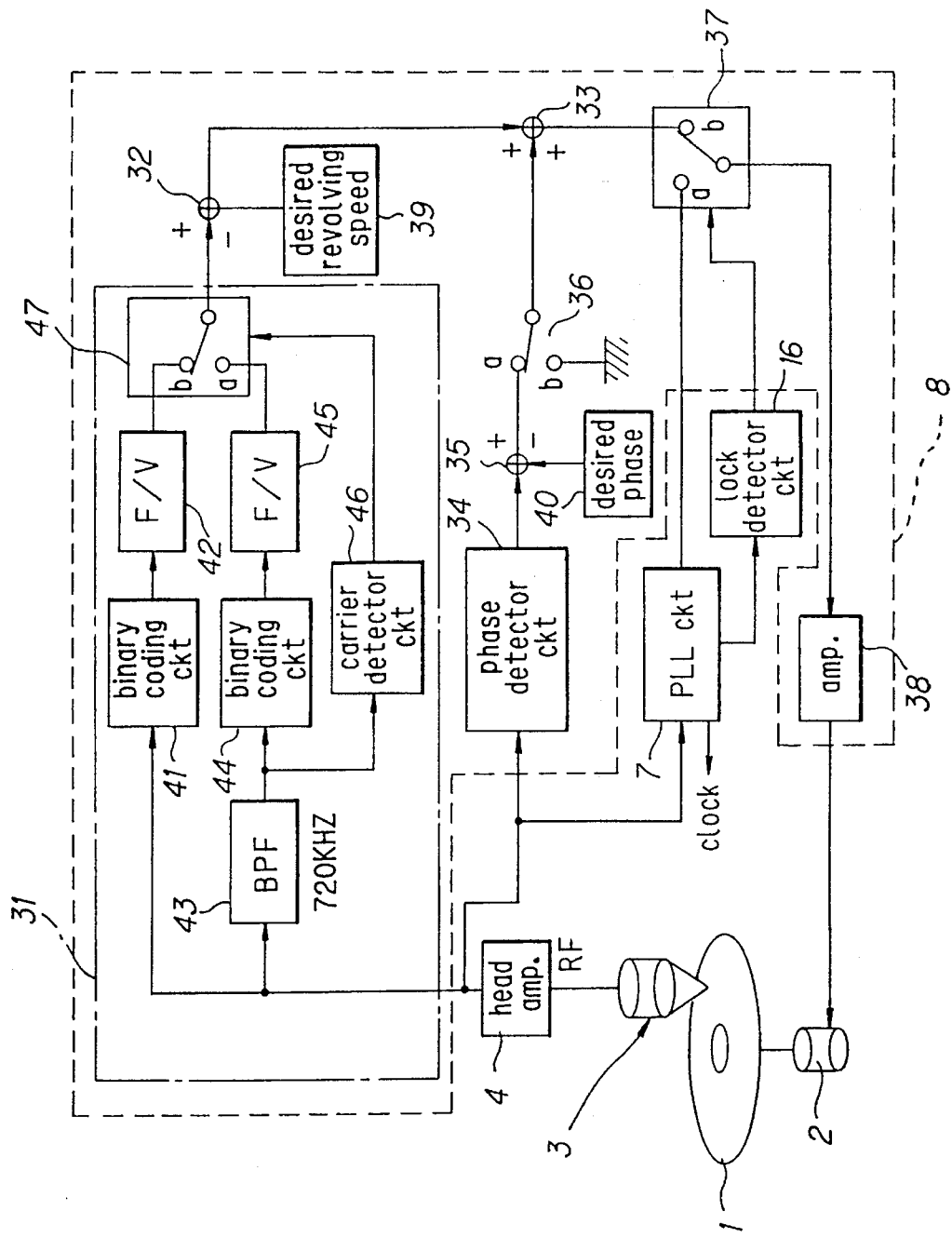
FIG. 8 is a block diagram showing a structural example of a frequency detecting circuit in the embodiment of FIG. 5.

FIG. 8 shows a structural example of the frequency detector circuit 31 in more detail. In this embodiment, the RF signal outputted by the head amplifier 4 is largely amplified and then binary-coded by a binary coding circuit 41. The binary-coded signal is inputted to a frequency-to-voltage converter circuit (F/V) 42 so that the signal is converted into voltage corresponding to a frequency. When the speed of the optical disc 1 does not yet attain a regular speed, then a switch 47 is switched over to a contact b side. Therefore, the voltage outputted by the frequency-to-voltage converter circuit 42 is supplied to the subtracter 32 as an output signal of the frequency detector circuit 31.

Therefore, even -though no sensor is provided for obtaining radius information, the optical disc 1 can be controlled to a rotational speed inverse-proportional to a radius of the optical disc 1.

Figure 9:
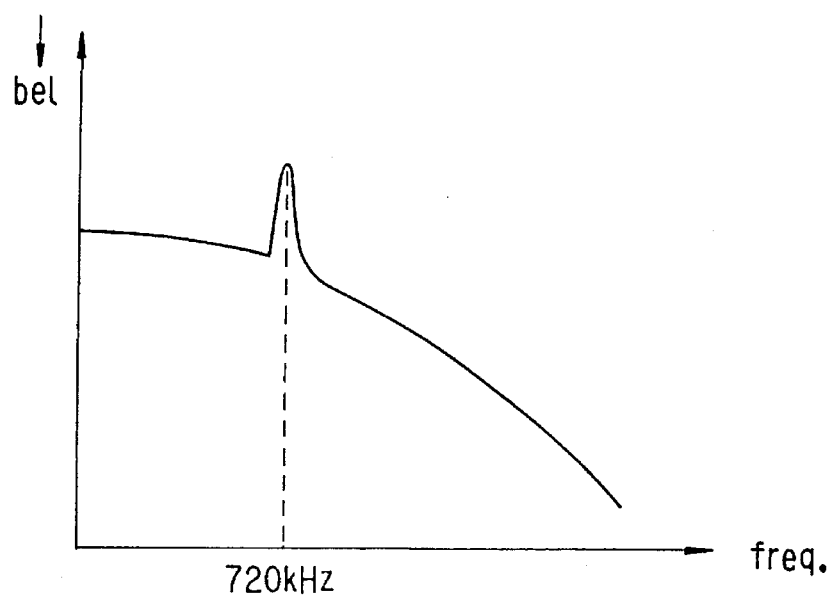
FIG. 9 is a diagram showing a frequency spectrum of a reproduced signal outputted from a head amplifier of FIG. 5.
Figure 10:
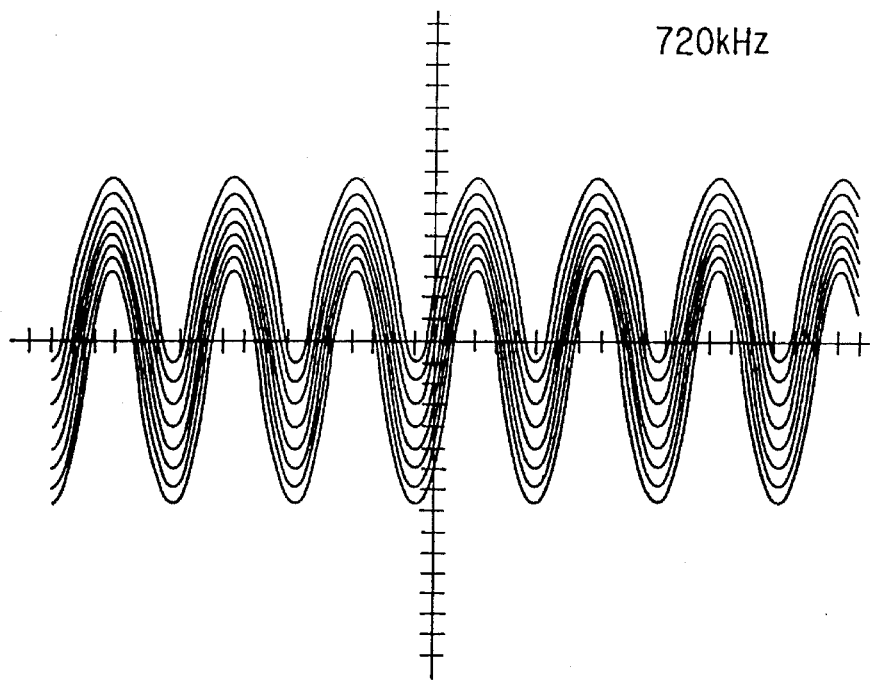
FIG. 10 is a diagram showing a waveform of an RF signal outputted from the head amplifier of FIG. 5.

When the optical disc 1 is being rotated at the regular speed, the reproduced RF signal outputted by the head amplifier 4 has a spectrum as shown in FIG. 9. That is, because the pits recorded on the optical disc 1 are recorded in the constant period (the interval on the disc is 1.67 μm as shown in FIG. 1), a peak exists at a frequency of 720 kHz corresponding to the period. However, because the positions of the front and rear edges of each pit are shifted in correspondence with recording data, the RF signal has a waveform, for example, as shown in FIG. 10. That is, the RF signal is constituted by a sine wave having a basic frequency of 720 kHz. However, the phase of the RF signal is always changed in correspondence with the recording data. Further, the RF signal contains the fluctuation of a d.c. component and the asymmetric property of a signal. Therefore, even though the reproduced signal is binary-coded by the binary-coding circuit 41 and its frequency is converted into voltage by the frequency-to-voltage converter circuit 42 thereby to drive the spindle motor 2, it is difficult to control the rotational speed of the spindle motor 2 to the regular speed with accuracy.

Figure 11:
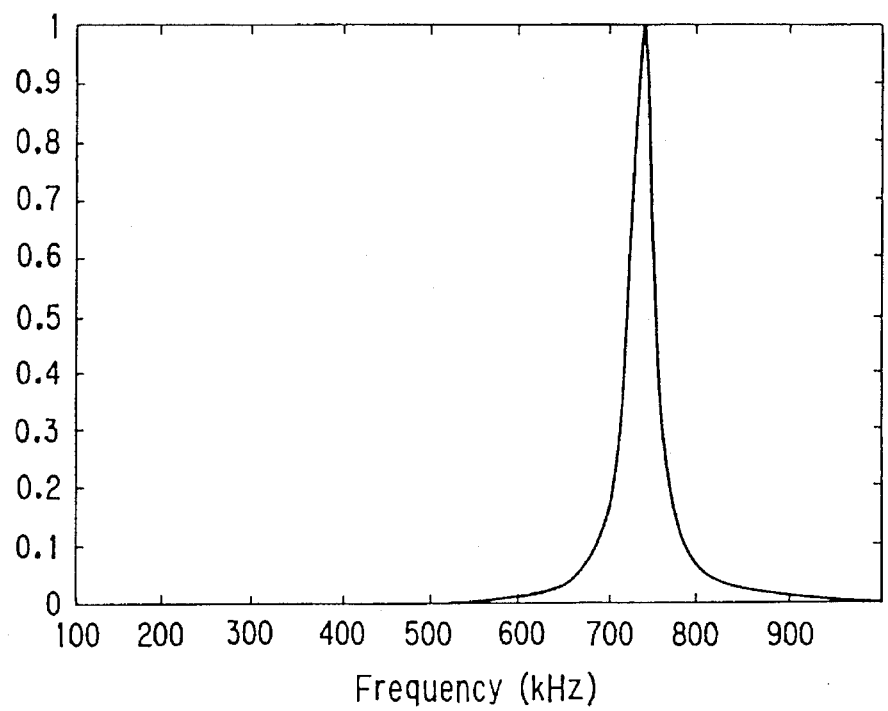
FIG. 11 is a diagram showing a transfer characteristic of a band pass filter of FIG. 8.

In view of the above, in this embodiment, a band pass filter (BPF) 43 allows only a frequency component of 720 kHz to be extracted from the reproduced RF signal outputted by the head amplifier 4. That is, the BPF 43 has a characteristic, for example, as shown in FIG. 11. As a result, the output level of the BPF 43 is rapidly increased when the rotational speed of the optical disc 1 approaches the regular speed. A carrier detector circuit 46 detects the output level of the BPF 43, and when the level exceeds a predetermined reference value, the switch 47 is switched over to a contact a side directly or the controller 15.

Figure 12:
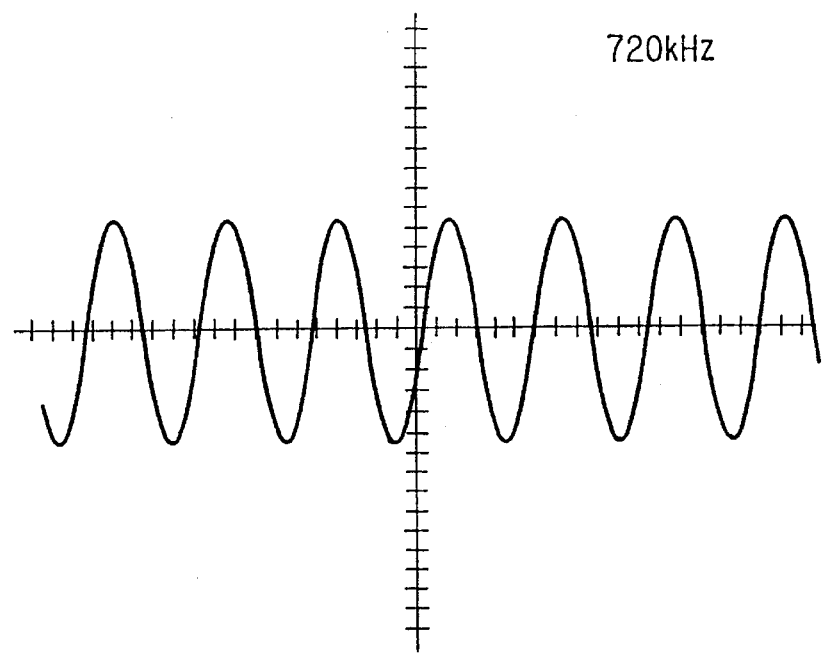
FIG. 12 is a diagram showing a waveform of an output signal of the band pass filter shown FIG. 8.

The waveform of the signal outputted by the BPF 43 is a relatively fine sine waveform having a frequency of 720 kHz, as shown in FIG. 12. Therefore, when the output signal of the BPF 43 is binary-coded by a binary coding circuit 44 and then converted into voltage corresponding to the frequency by a frequency-to-voltage converter circuit 45, the voltage comes to voltage relatively accurately corresponding to the rotational speed of the optical disc 1. Accordingly, if the rotation of the spindle motor 2 is controlled in accordance with this voltage, the rotation of the optical disc 1 can be frequency-controlled with accuracy.

Figure 13:
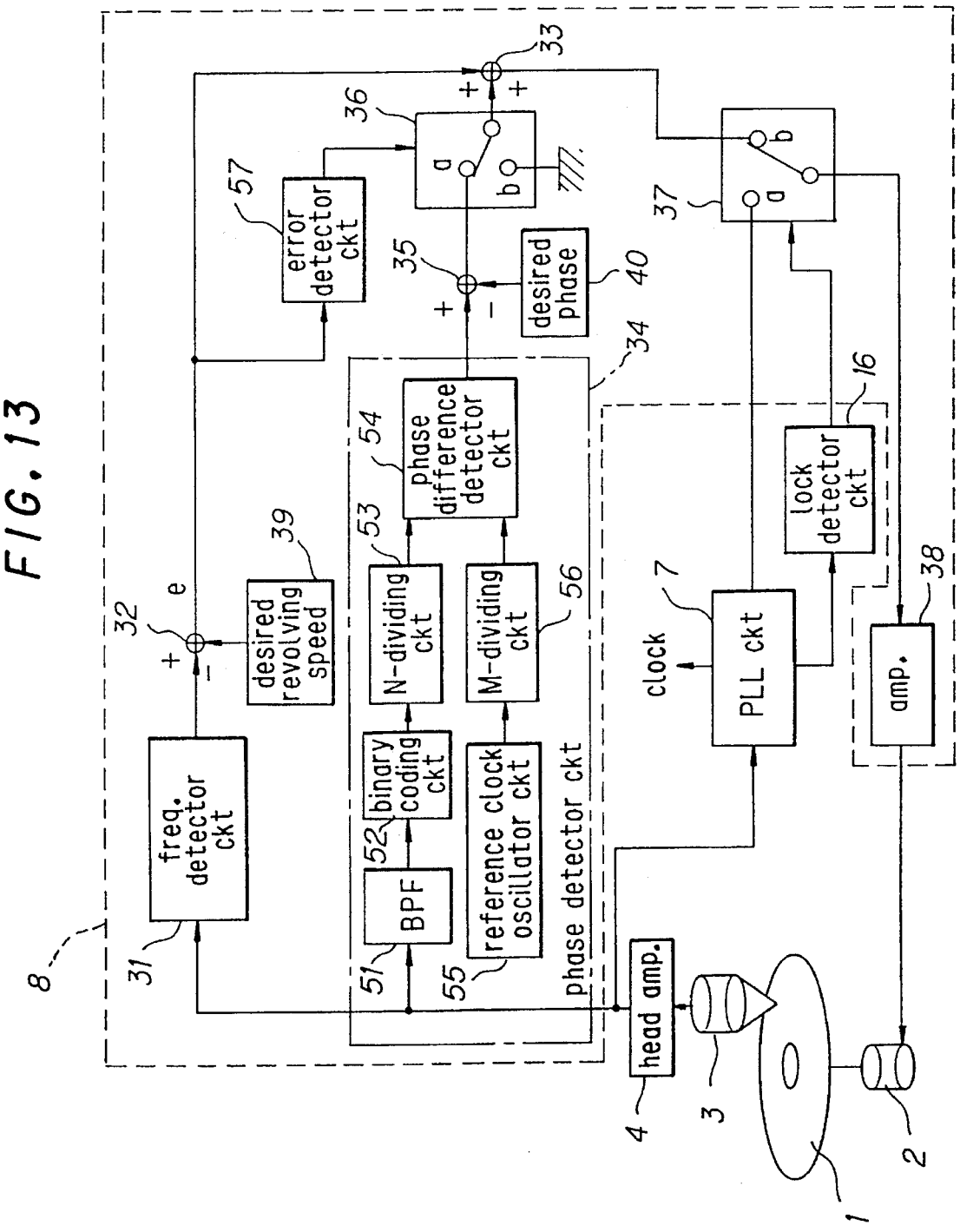
FIG. 13 is a block diagram showing a structural example of a phase detecting circuit shown in FIG. 7.

FIG. 13 shows a structural example of the phase detector circuit 34 in detail. In this embodiment, a BPF 51 extracts the frequency component of 720 kHz from the reproduced RF signal outputted by the head amplifier 4. As described above, in the stage where the phase detector circuit 34 is operated, because the frequency servo is effected by the frequency detector circuit 31, the rotational frequency of the optical disc 1 is a value close to the regular frequency. Therefore, likewise as in the BPF 43 shown in FIG. 8, the BPF 51 having the frequency characteristics shown in FIG. 11 outputs a signal as shown in FIG. 12. Then, the output signal of the BPF 51 is inputted to a binary coding circuit 52 so as to be binary-coded. Therefore, because the BPF 51 and the binary coding circuit 52 correspond to the BPF 43 and the binary coding circuit 44 in the frequency detector circuit 31, these circuits can be commonly used.

The output signal of the binary coding circuit 52 is inputted to a frequency divider circuit 53 so as to be divided into a frequency of 1/N. Then, the output signal of the frequency divider circuit 53 is supplied to a phase difference detector circuit 54.

Also, to the phase difference detector circuit 54, a reference clock signal having a constant frequency outputted by a reference clock oscillator circuit 54 is inputted to a frequency divider circuit 56 so as to be divided into a frequency of 1/M, and thereafter is supplied. The phase difference detector circuit 54 detects a phase difference between a signal inputted by the frequency divider circuit 53 and a signal inputted by the frequency divider circuit 56 to output a phase error signal. As a result, the optical disc 1 is effected by the phase servo so that a frequency corresponding to a period of the pits is synchronous in phase with the reference clock signal.

The signal outputted by the BPF 51 and the reference clock signal outputted by the reference clock oscillator circuit 55 are not directly compared in phase with each other, but after they are divided by the frequency divider circuits 53 and 56, they are compared. As a result, although a phase detection sensitivity is lowered, it is prevented that the phase difference exceeds 2π and the return of the phase error occurs as a result of which the phase error per se has no effect, even though a time axis is distorted by influence of eccentricity or the like. Thus, the accurate phase error can be always obtained.

Further, in this embodiment, an error detector circuit 57 detects a level of the error signal of the frequency servo outputted by the subtracter 32. When the level of the error signal falls within a predetermined reference value which has been preset, a contact of the switch 36 is switched from a contact b side to a contact a side directly or through the controller 15.

Alternatively, it is possible that the level of the error signal by the frequency servo usually becomes a sufficient small value when a predetermined time is elapsed after starting, the switch 36 is switched from the contact b side to the contact a side at a timing when the predetermined time which has been preset is elapsed after the frequency servo starts (after starting).

Figure 14:
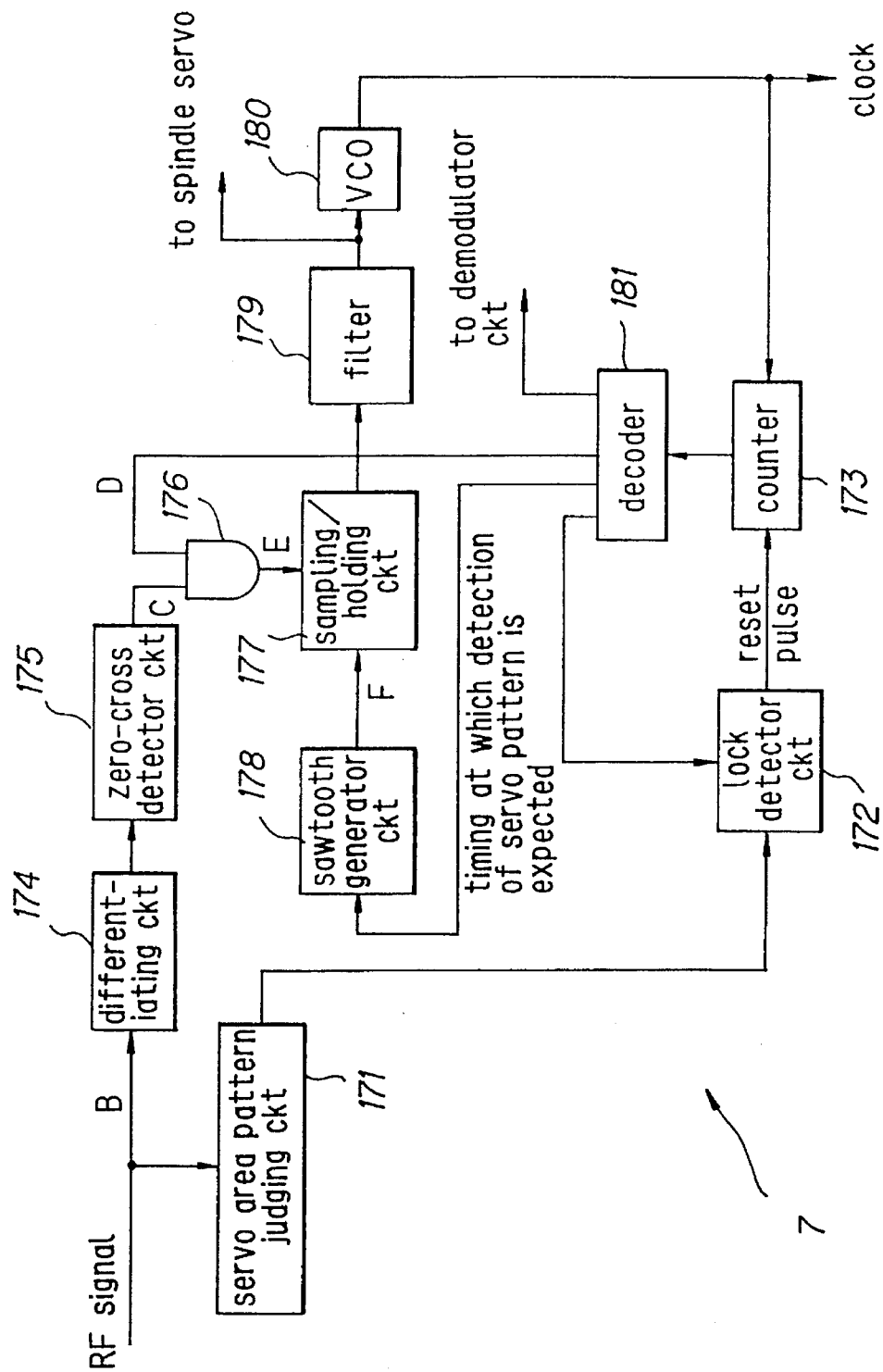
FIG. 14 is a block diagram showing a structural example of a PLL circuit shown in FIG. 5.

FIG. 14 is a block diagram showing a structural example of the PLL circuit 7. In the figure, when a servo area pattern judging circuit 171 detects a pattern (for example, patterns (7,0), (0,0), (7,7), (0,7), (0,7) of both edges of the reference pits P1 to P5), which is expected to be a servo region from the RF signal, it generates a servo region detecting pulse. Here, there is a possibility that the same pattern as the servo region appears in the data region, and the pulse is not always correct. First of all, assuming that this is correct, a lock detector circuit 172 supplies a reset pulse to a counter 173 in accordance with that signal to reset the counter 173.

If this is a correct servo region, the detection pulse must be always outputted from the servo area pattern judging circuit 171 at the same timing since then. The lock detector circuit 172 detects this fact and judges whether the PLL circuit 7 stands in a lock state or not.

That is, data regarding a succeeding detection pulse generating timing is supplied from a decoder 181 for monitoring a count value of the counter 173 to the lock detector circuit 172. The lock detector circuit 172 suspends the generation of a succeeding reset pulse until this timing, and when the circuit 172 inputs the detection pulse at that timing, it outputs the reset pulse again. What is previously inputted from the servo area pattern judging circuit 171 is not a correct detection pulse, since the succeeding detection pulse is not inputted even after a constant time is elapsed, then the reset pulse is outputted again in synchronism with the detection pulse to be succeedingly inputted, and the above-mentioned operation is repeated.

After the servo region is correctly detected, since the counter 173 is reset at the correct timing, the timing at which the succeeding servo region appears can be nearly accurately expected by decoding the count value of the counter 173. Using this principle, a timing signal appearing at a specific pit in the servo region is produced to be supplied to an AND gate 176 as a gate signal, as shown in FIG. 15(D).

For the purpose of removing any influence of data recorded on both sides of the servo region, the timing of the gate signal is adjusted so that a pit positioned in the center of the servo region is selected possibly. As shown in Figs. 15(A) and 15(D), in this embodiment, the gate signal is generated between the reference pits P2 and P3.

The RF signal shown in FIG. 15(B) is differentiated by a differentiating circuit 174, and a zero-cross detection signal (FIG. 15(C)) is produced by a zero-cross detector circuit 175. Among those signals, what passes through the AND gate 176 is a phase comparing pulse (FIG. 15(E)) and supplied to a sampling/holding circuit 177. That is, in this embodiment, a zero-cross point between the reference pits P2 and P3 is detected as an edge of a clock pit (virtual pit).

The sampling/holding circuit 177 immediately samples and holds a level of a saw-tooth wave (FIG. 15(F)) generated by a sawtooth generator circuit 178 at a timing of the pulse inputted from the AND gate 176 in correspondence with the count value of the counter 173, thereby to detect a time difference (phase error) between a clock signal (an output signal of a voltage control oscillator circuit (VCO) 180) counted up by the counter 173 and a specific pit existing in the servo region on the optical disc 1 (virtual clock pit)(a timing of a zero-cross of the RF signal between the reference pits P2 and P3). The phase error signal is fed back to a VCO 180 as a drive voltage (control voltage) after it passes through a filter 179, and the PLL is operated so that the specific pit existing in the servo region on the optical disc 1 and the clock signal (an output signal of the VCO 180) always keep a correct phase relationship.

The output signal of the above-mentioned counter 173 is decoded by the decoder 181 thereby to generate various timing clock signals having a predetermined phase relationship, which are supplied to the A/D converter circuit 9, the bias removing circuit 10 and the two-dimensional decoder 11 shown in FIG. 5, and the like.

Figure 15:
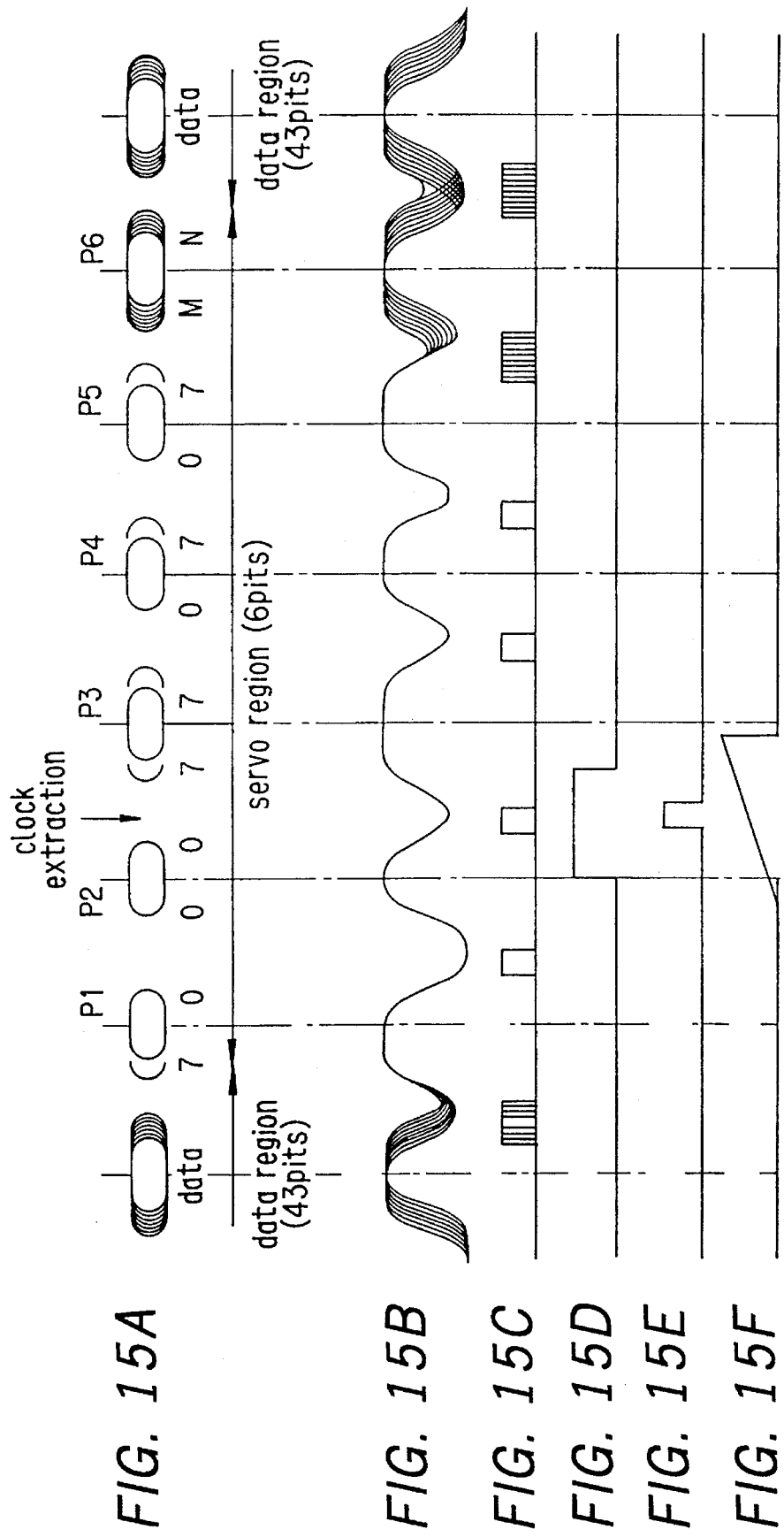
FIGS. 15(A) to 15(F) are timing charts for explaining the operation of the PLL circuit shown in FIG. 14.

In the case where the servo pattern of the servo region is formed as shown in FIG. 15, the servo area pattern judging circuit 171 in FIG. 14 is relatively difficult to detect the servo pattern. Therefore, a servo pattern shown in FIG. 16 can be formed.

FIGS. 16(A) to 16(E) show such a format that the servo pattern can be more easily detected. In this embodiment, as shown in FIG. 16(A), the opposed edges of the reference pits (synchronous pits) P4 and P5 are shifted at a position which cannot be a shift position corresponding to the recording data.

That is, each edge of the data pit is shifted at any position of 0 to 7 in correspondence with the recording data, and the rear edge of the pit P4 and the front edge of the pit P5 are shifted at the position of 8, respectively. The edge at the position of 8 (synchronous data) exists not in the data region, but only in the servo region. Accordingly, by detecting the synchronous data, the servo region can be readily detected.

Figure 16:
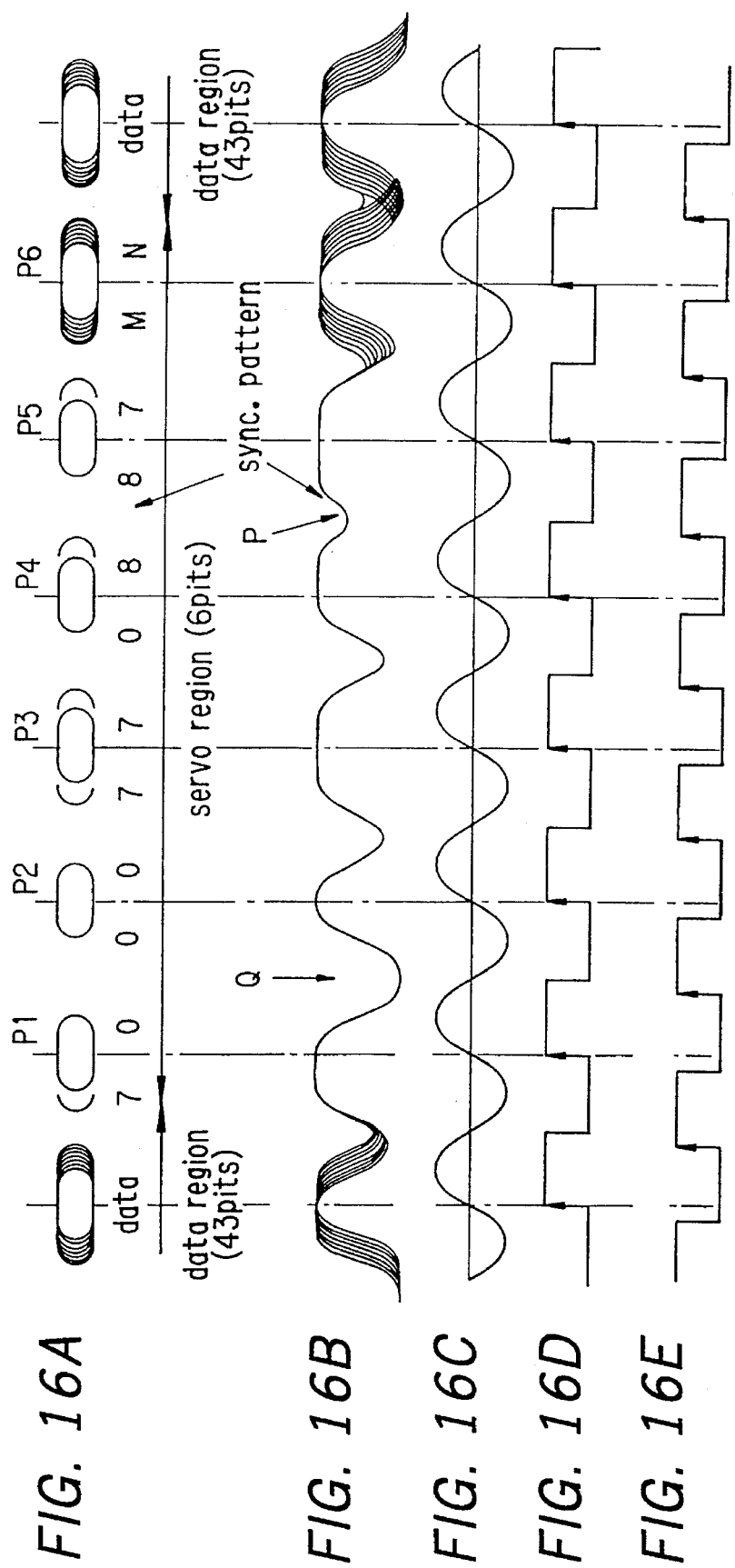
FIGS. 16(A) to 16(E) are timing charts for explaining the operation of a servo area pattern judging circuit shown in FIG. 17 when a synchronous pattern is recorded in a servo region.
Figure 17:
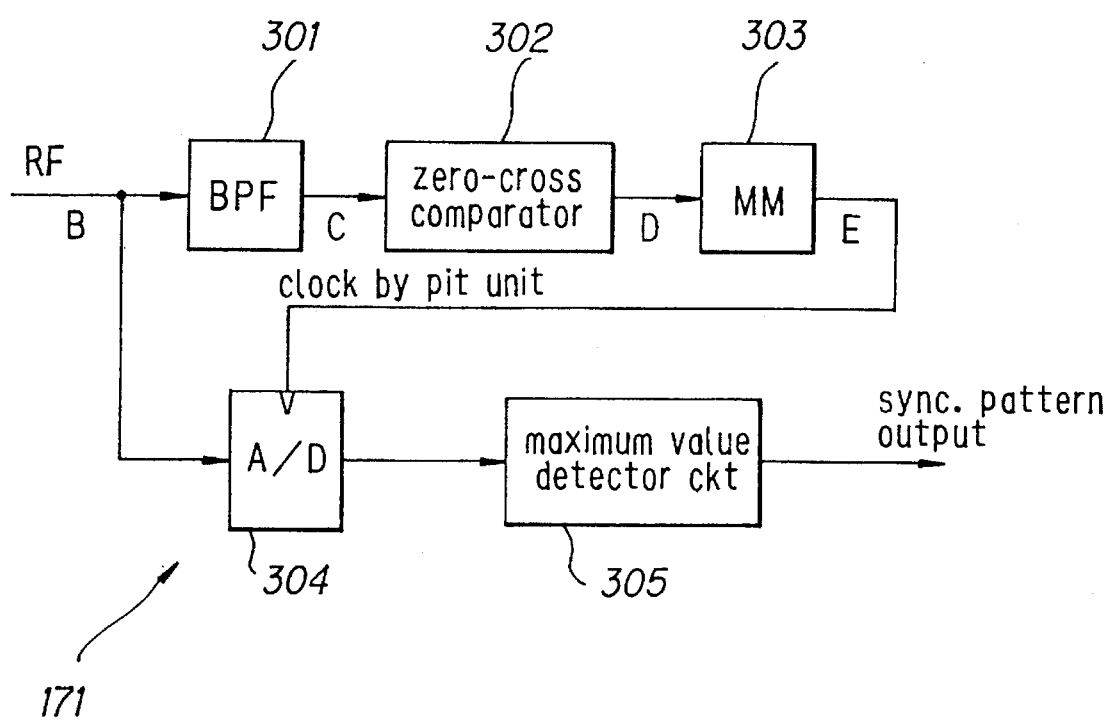
FIG. 17 is a block diagram showing a structural example of the servo area pattern judging circuit shown in FIG. 14 when the synchronous pattern is recorded in the servo region.

FIG. 17 shows a structural example of the servo area pattern judging circuit 171 in the case where such synchronous data is formed in the servo region. That is, in this embodiment, the RF signal (FIG. 16(B)) outputted by the head amplifier 4 is supplied to an A/D converter circuit so that its level is detected. As described above, in a state where the PLL circuit 7 is not yet locked, it is necessary that the servo area pattern judging circuit 171 judges the servo region. Therefore, sampling operation cannot be performed by the A/D converter circuit 304, using a clock signal produced by the PLL circuit 7. For that reason, in this embodiment, in order to generate the sampling clock signal of the A/D converter circuit 304, the following operation is made.

That is, the RF signal is inputted to a BPF 301 so that the above-mentioned frequency component (FIG. 16(C)) of 720 kHz is extracted from the RF signal. A zero-cross comparator 302 compares a level of a sine wave signal outputted by the BPF 301 with a zero level, thereby to generate a clock signal (FIG. 16(D)) of a H level when the output level of the BPF 301 is larger than the zero level, but a L level when the former is not larger than the latter. The clock signal is delayed for a predetermined time of period by a monomultiple vibrator (MM) 303 to produce a clock pulse (FIG. 16(E)) of the A/D converter circuit 304.

The clock signal (FIG. 16(D)) outputted by the zero-cross comparator 302 corresponds to a period of the pit recorded on the optical disc 1, and the clock signal (FIG. 16(E)) outputted by the MM 303 is a clock signal whose rise edge is at a timing corresponding to the synchronous pattern. That is, as shown in FIG. 16(B), a level P of the RF signal at a timing corresponding to the synchronous pattern is always larger than a level at any other positions (a level in the case where the shift position of the edge is at any position of 0 to 7). Accordingly, if a maximum value is detected from the output signal of the A/D converter circuit 304 by a maximum value detector circuit 305, its timing becomes a timing for detection of the synchronous pattern.

Thus, the positions of the opposed edges of two reference pits P4 and P5 are set to positions different from those corresponding to the recording data, whereby a difference in level between the RF signal corresponding to the recording data and the RF signal corresponding to the synchronous data can be enlarged with the result that the synchronous data can be detected with accuracy and stability.

Figure 18:
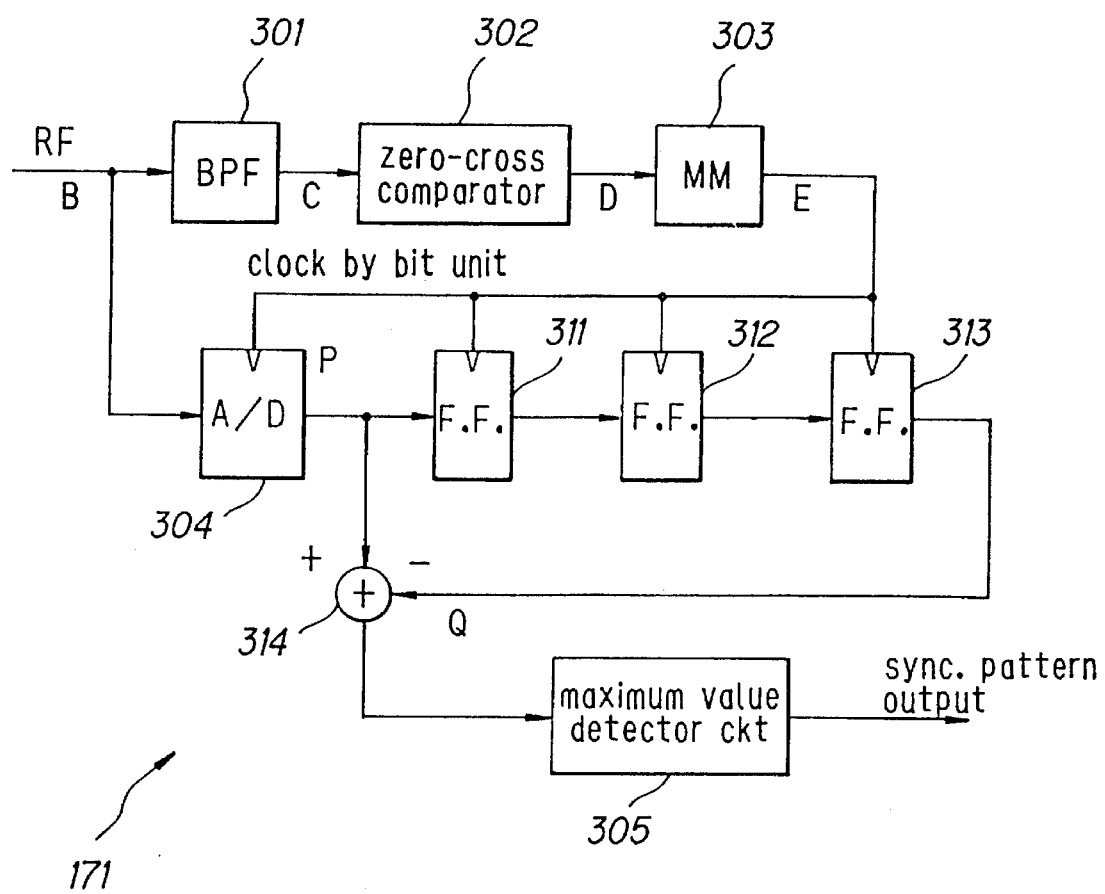
FIG. 18 is a block diagram showing another structural example of the servo area pattern judging circuit shown in FIG. 14 when the synchronous pattern is recorded in the servo region.

FIG. 18 shows another structural example of the servo area pattern judging circuit 171. In this embodiment, the output signal of the A/D converter 304 is directly supplied to a subtracter 314 and also supplied thereto through three cascade-connected D-type flip flops (FF) 311 to 313. The subtracter 314 subtracts an output signal of the FF 313 at the final stage from an output signal of the A/D converter circuit 304 to output a signal to the maximum value detector circuit 305.

That is, as shown in FIG. 16(A), in the servo region shown in this embodiment, the opposed edges of the reference pits P1 and P2 are shifted to a position of 0 (a position of a bias reference, respectively. Therefore, a level Q of the RF signal between the reference pits P1 and P2 comes to the smallest level. As is apparent from FIGS. 16(A) and 16(B), an interval between a level P and the level Q of the RF signal is apart by three clocks when converting the pits outputted by the MM 33 into clocks. Because the FFs 311 to 313 output newly inputted data to a succeeding stage every one clock, at a timing at which the A/D converter circuit 304 outputs the level P of the reproduced RF signal, the FF 313 outputs a signal corresponding to the level Q. As a result, the subtracter 314 outputs a value subtracting the level Q from the level P.

The level Q is the highest level in the reproduced RF signals, but its absolute value is changed due to the dispersion of the optical disc 1, or the like. However, in this case, since the level Q as well as the level P is changed, a value subtracting the level Q from the level P is not caused by the dispersion of the optical disc 1 or the like, but becomes a nearly constant value. For that reason, the output signal of the subtracter 314 is compared with a predetermined reference value which has been preset in the maximum value detector circuit 305, whereby its maximum value, that is, the level P can be detected surely regardless of the bias fluctuation. Therefore, a difference between the synchronous data 8 and the recording data 7 can be made small, and as much, the width (interval of 0 to 7) of change of the recording data is increased, thereby being capable of making the margin of decoding the recording data large.

Figure 19:
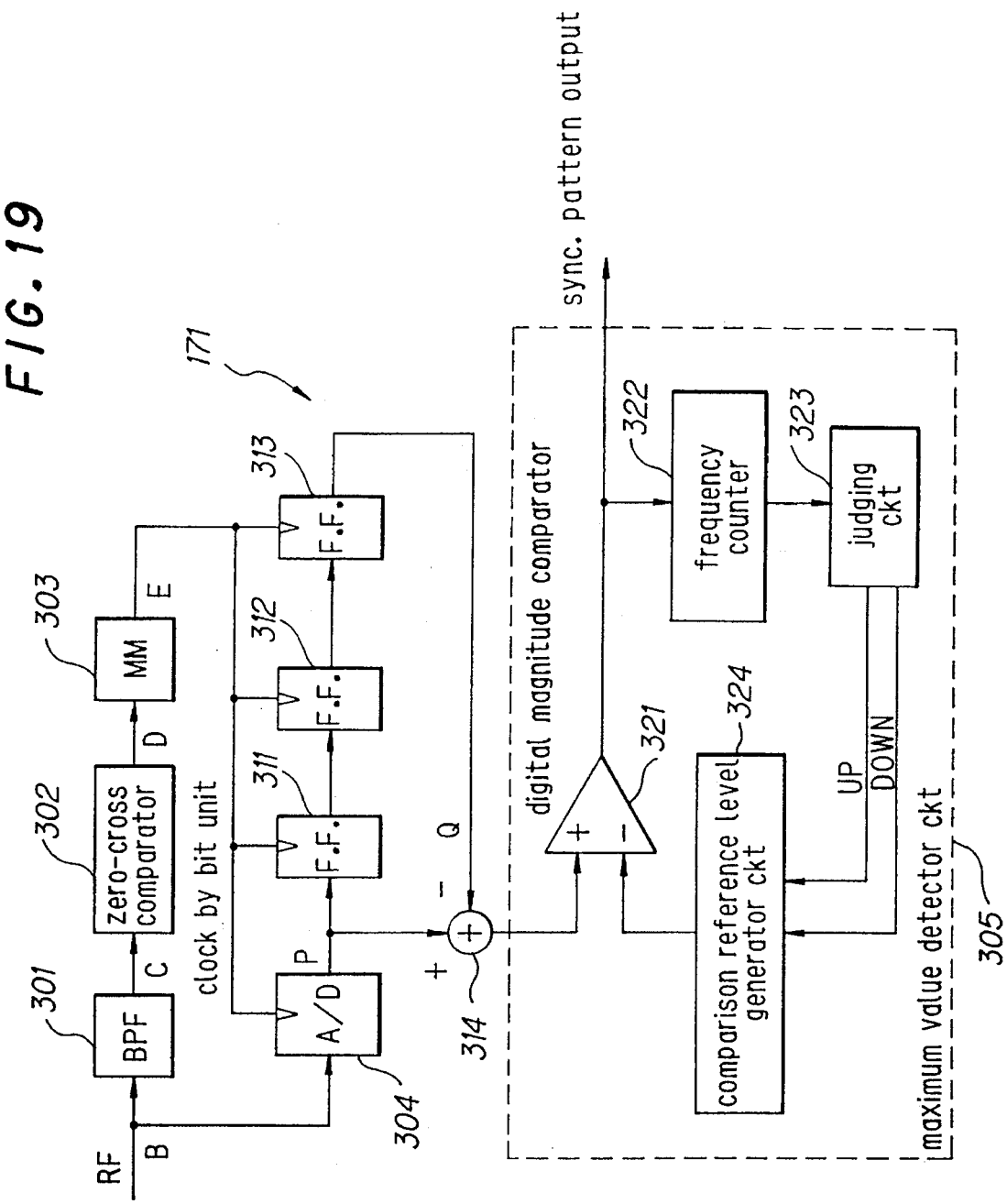
FIG. 19 is a block diagram showing a structural example of a maximum value detecting circuit shown in FIG. 18.

FIG. 19 shows another structural example of the maximum value detector circuit 305. In this embodiment, a signal outputted by the subtracter 314 is supplied to a digital magnitude comparator 321 so as to be compared with a comparison reference level outputted by a comparison reference level generator circuit 324. As described above, the level of the signal outputted from the subtracter 314 is smaller than the comparison reference level at a timing except for the level P corresponding to the synchronous data. Therefore, the comparator 321 usually outputs a signal of an L level. When the subtracter 314 outputs the level P, the comparator 321 outputs a signal of an H level (synchronous pattern (data) detection signal).

A frequency counter 322 resets a count value when inputting a signal of the H level from the comparator 321, and executes the count operation of a built-in fixed clock until it newly inputs a signal of the H level. That is, the frequency counter 322 counts a period of the synchronous data (the inverse number of a frequency). A judging circuit 323 monitors the count value of the frequency counter 322, and outputs an UP signal when the count value of the frequency counter 322 is shorter than a period of the pit (720 kHz when converting it into a frequency)(when the frequency is higher than 720 kHz), but outputs a DOWN signal when the count value is longer than the period of the pit (when the frequency is lower than 720 kHz). The comparison reference level generator circuit 324 makes the generated comparison reference level up when inputting the UP signal from the judging circuit 323, and makes it down when inputting the DOWN signal.

That is, in the case where the comparison reference level is too small, because the signal having the H level is outputted from the comparator 321 even at a timing except for the synchronous data, a period detected by the frequency counter 322 is made short (the frequency becomes high). Therefore, in this case, the comparison reference level is elevated. Inversely, in the case where the comparison reference level is too large, the comparator 321 does not come to output the detection signal of the H level. For that reason, the period detected by the frequency counter 322 is made long (the frequency is made low). Therefore, in this case, the comparison reference level is made small. In this way, the comparison reference level is automatically controlled so that the frequency of the detection signal having the H level outputted by the comparator 321 is set to 720 kHz.

Because the pits of the optical disc 1 are different for every disc, when the comparison reference level is fixed, it is necessary to adjust its value to every disc. However, according to this embodiment, since the value is automatically controlled, the adjustment of the comparison reference level is unnecessary.

In the above-mentioned embodiment, the synchronous data is set to the shift position of 8 larger than any value of 0 to 7. Also, it is possible to set the synchronous data to a position of a still larger value 9, 10 or the like, or inversely to a position of −1, −2 or the like smaller than 0.

Figure 20:
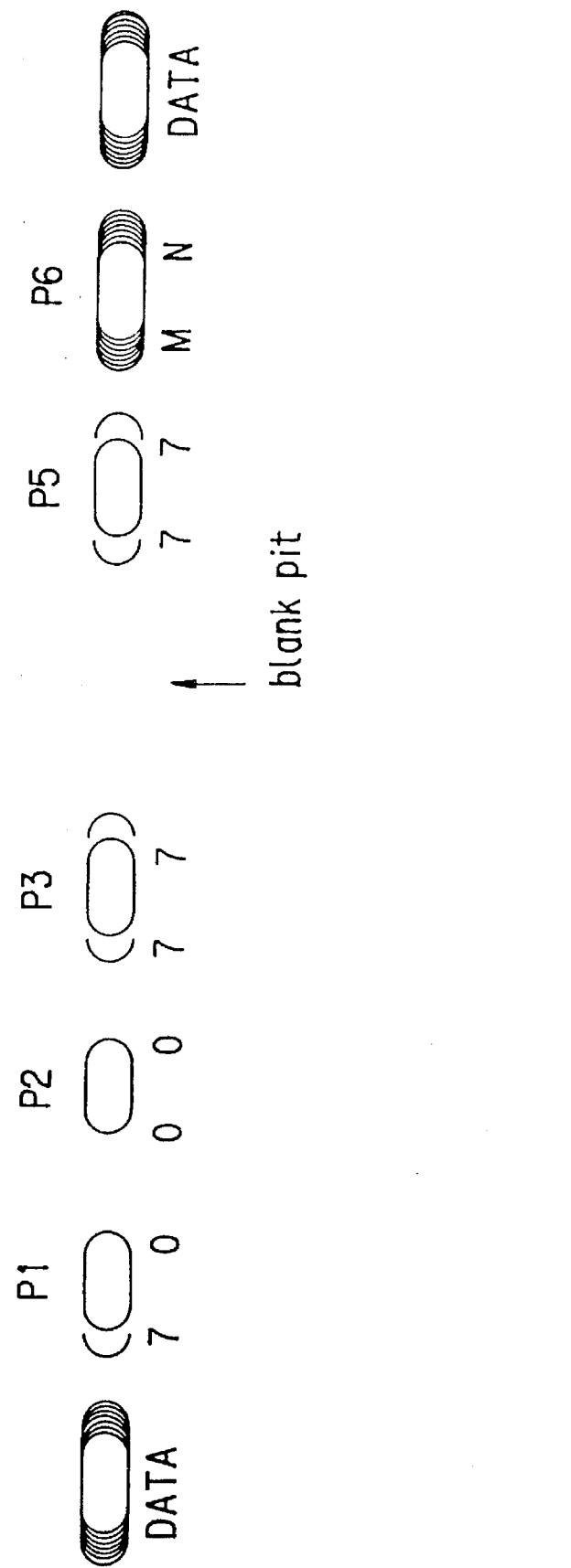
FIG. 20 is a diagram for explaining an example of another format of the synchronous pattern.

Further, in the above-mentioned embodiment, the position of the reference pit is shifted to a position at which the pit cannot be arranged by modulation of the recording data, thereby to constitute the synchronous data. For example, as shown in FIG. 20, one pit P4 of the position to be arranged is removed, thereby being capable of constituting the synchronous pattern (data). In this case, because the RF signal is most lowered at that position, the synchronous pattern can be detected by detecting it.

However, if the formation of the pit is thus omitted, a principle by which the pits are always formed in a constant period is broken. Therefore, as shown in FIG. 16(A), it is preferable to form the synchronous pattern.

Figure 21:
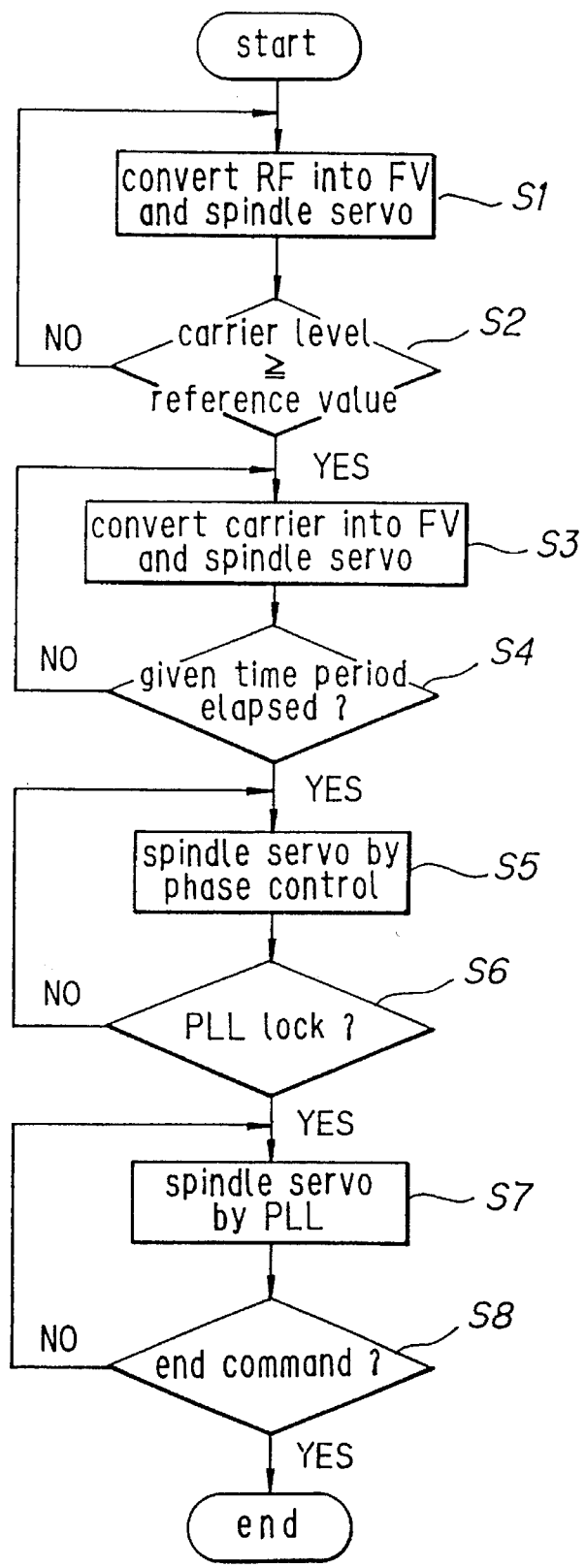
FIG. 21 is a flow chart for explaining the operation of controlling the rotational movement of the optical disc according to the invention.
Figures 23A, 23B, 23C:
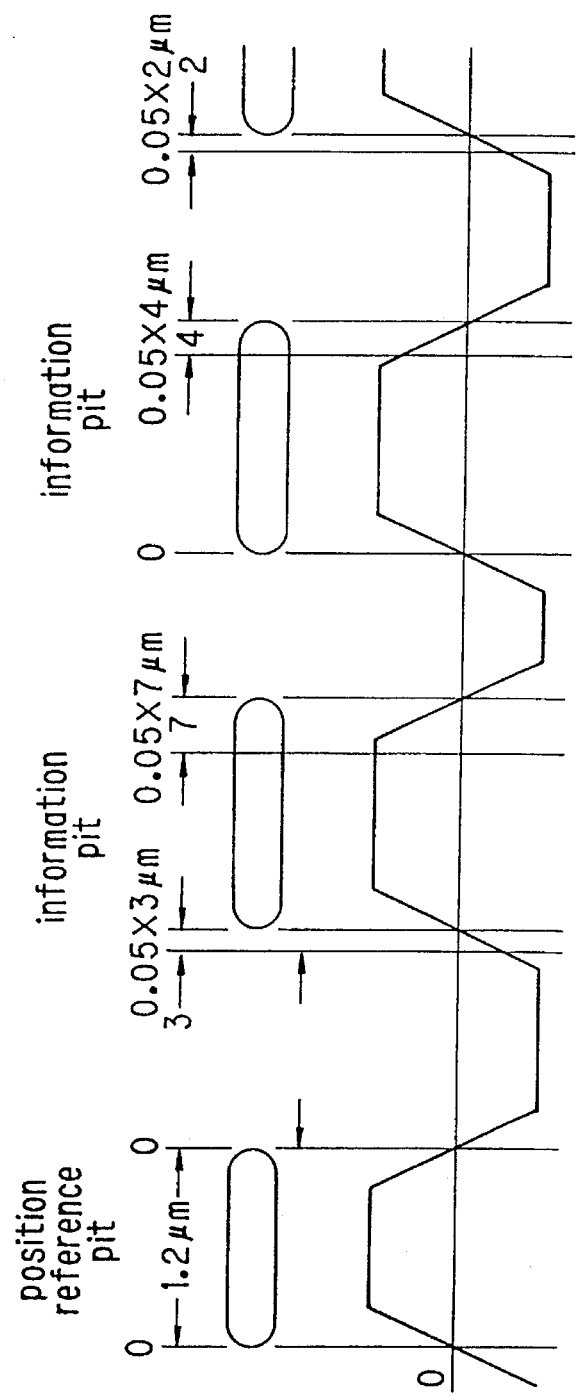
FIGS. 23(A) to 23(C) are diagrams for explaining a principle of recording data by changing the position of a pit edge in correspondence with recording data.
Figures 24A, 24B, 24C, 24D:
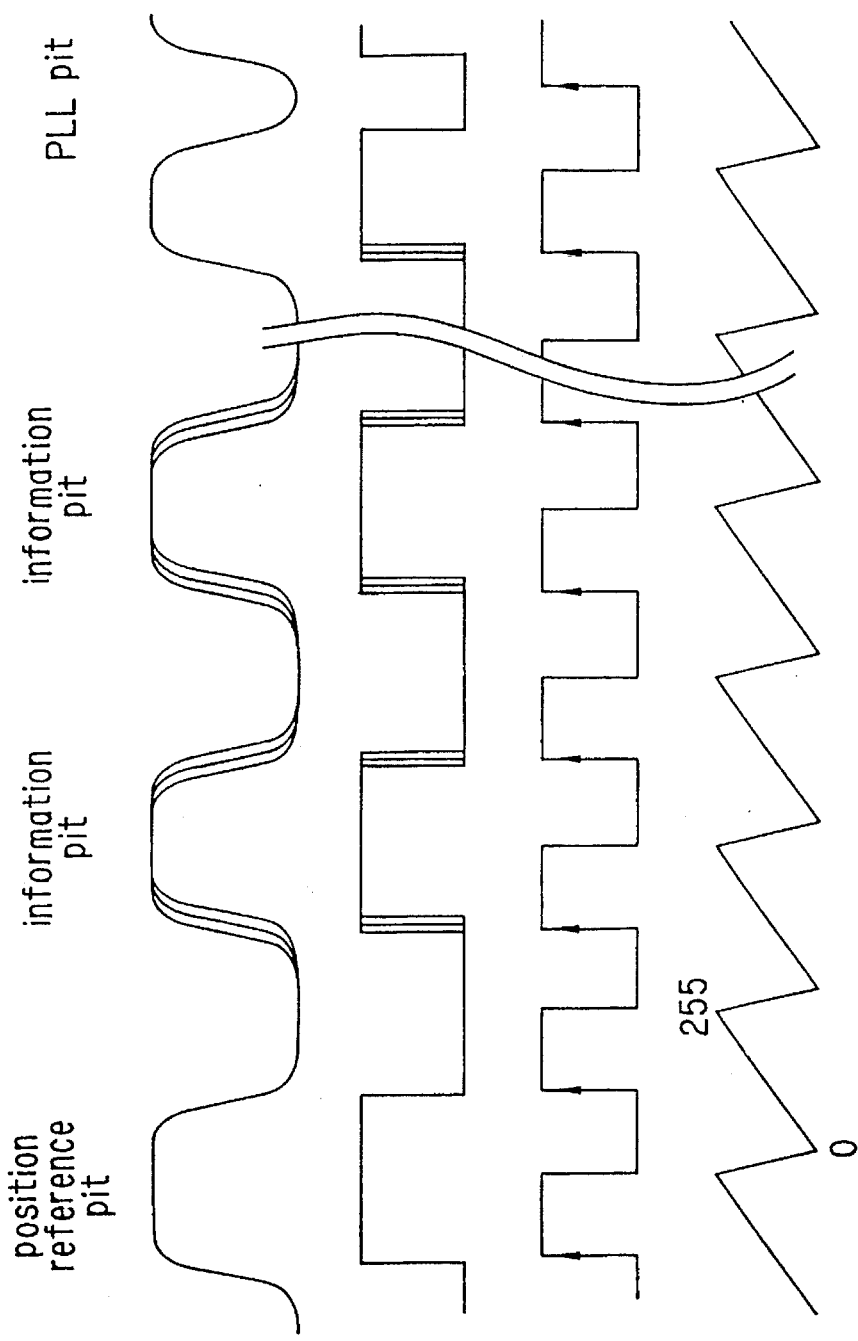
FIGS. 24(A) to 24(D) are diagrams for explaining a principle of reproducing a pit whose edge position has been changed step-by-step.

FIG. 21 shows a preferred process together when the optical disc 1 is started in the above-mentioned embodiment. As shown in the figure, initially in Step 1, the reproduced RF signal is converted into a voltage corresponding to its frequency in the frequency-to-voltage converter circuit 42 (FIG. 8) thereby to drive the spindle motor 2. Then, in Step S2, when the level (carrier level) of a frequency of 720 kHz outputted from the BPF 43 exceeds a predetermined reference value which has been preset, the spindle motor 2 is driven in accordance with the output signal of the frequency-to-voltage converter circuit 42 until judgment is made by the carrier detector circuit 46.

Subsequently, in Step S2, when the carrier detector circuit 46 judges that the output signal of the BPF 43 is larger than the predetermined reference value, the process advances to Step S3, thereby to switch the switch 47 over to the contact a side. Therefore, the spindle motor 2 is driven in accordance with a signal resulting from subjecting the carrier having a frequency of 720 kHz extracted from the BPF 43 to frequency-to-voltage conversion by the frequency-to-voltage converter circuit 45. Then, after the spindle servo is started in accordance with the signal obtained by frequency-to-voltage converting the carrier of the pit recorded in the constant period, in step S4, when it is judged that a preset constant time of period is elapsed, process advances to Step S5. Alternatively, in Step S4, as was described with reference to FIG. 13, when the error detector circuit 57 judges that the level of the signal outputted from the subtracter 32 is reduced to less than a predetermined range, the process may advance to Step S5.

In Step S5, the switch 36 is switched from the contact b side to the contact a side, thereby to execute the spindle servo in accordance with the phase error signal detected by the phase detector circuit 34.

Subsequently, in Step S6, it is judged whether the PLL circuit 7 is locked or not, and when the lock detector circuit 16 judges that the PLL circuit 7 is locked, the switch 37 is switched from the contact b side to the contact a side. That is, the output signal (that is, a control voltage inputted to the VCO 180) of the filter 179 of the PLL circuit 7 shown in FIG. 14 is supplied to the amplifier 38 through the contact a of the switch 37, and is further supplied from the amplifier 38 to the spindle motor 2. As a result, the spindle motor 2 is driven so that the clock signal outputted from the VCO 180 is made equal to the predetermined reference value which has been preset, thereby allowing the optical disc 1 to rotate.

Sequentially, in Step S8, until it is judged that the completion of reproduction (or recording) is instructed, the spindle servo is executed by the PLL circuit 7.

Finally, an embodiment of a recording apparatus for the above-mentioned optical disc 1 having a high recording density will be described. In FIG. 22, an information source 201 converts, as a signal to be recorded, an audio signal into a digital signal to output it. An ECC circuit 202 adds an error correcting code to digital audio data supplied from the information source 201 to output it to a converter circuit 203. The converter circuit 203 converts input data into data having three bits as a unit. That is, in this embodiment, the edge position of each pit is set to any of eight positions of 0 to 7. For that reason, in order to specify the position of each edge, data of three bits is necessary. In the converter circuit 203, the three-bit data is produced.

A clock information generator circuit 205 generates data (data "0" corresponding to the rear edge of the reference pit P2 and data "7" corresponding to the front edge of the reference pit P3 in FIG. 15) required for generating a clock signal necessary for reading data stored in the optical disc 1. A bias gain information generator circuit 206 generates data representative of a bias point (data "0" corresponding to the rear edge of the reference pit P2, data "0" corresponding to the front edge of the reference pit P4, or data representing that both positions of the front and rear edges are 0 as in P2, in FIG. 6), and data setting gain (data representing a reference point (7,7) and also representing that both positions of the front and rear edges are 7, as in the reference pit P3 of FIG. 6).

A PLL drawing signal generator circuit 207 generates synchronous data for drawing the PLL (data "8" corresponding to the rear edge of the reference pit P4 and data corresponding to the front edge of the reference pit P5 in FIG. 16). An education data generator circuit 208 generates data which makes the edge position (an, bn) of the front and rear edges of the education pit P6 in FIG. 6 to correspond to the edge positions of (0,0) to (7,7). Any data outputted from the clock information generator circuit 205, the bias gain information generator circuit 206, the PLL drawing signal generator circuit 207, and the education data generator circuit 208 is supplied to an adder 204 so as to be added to data supplied from the converter circuit 203 (time division multiplex).

An output signal of the adder 204 is supplied to a recording edge position calculator circuit 209, and an output signal of the recording edge position calculator circuit 209 is supplied to an edge modulator circuit 210. Then, an output signal of the edge modulator circuit 210 is supplied to a mastering unit 211 to perform such processes as cutting, developing, plating process, transfer, aluminum vapor deposition, protective film coating, etc. for preparation of the optical disc 1.

In the above-mentioned structure, the edge modulator circuit 210 generates a timing signal representative of a timing corresponding to data outputted from the recording edge position calculator circuit 209 to output it to the mastering unit 211.

Figure 2:
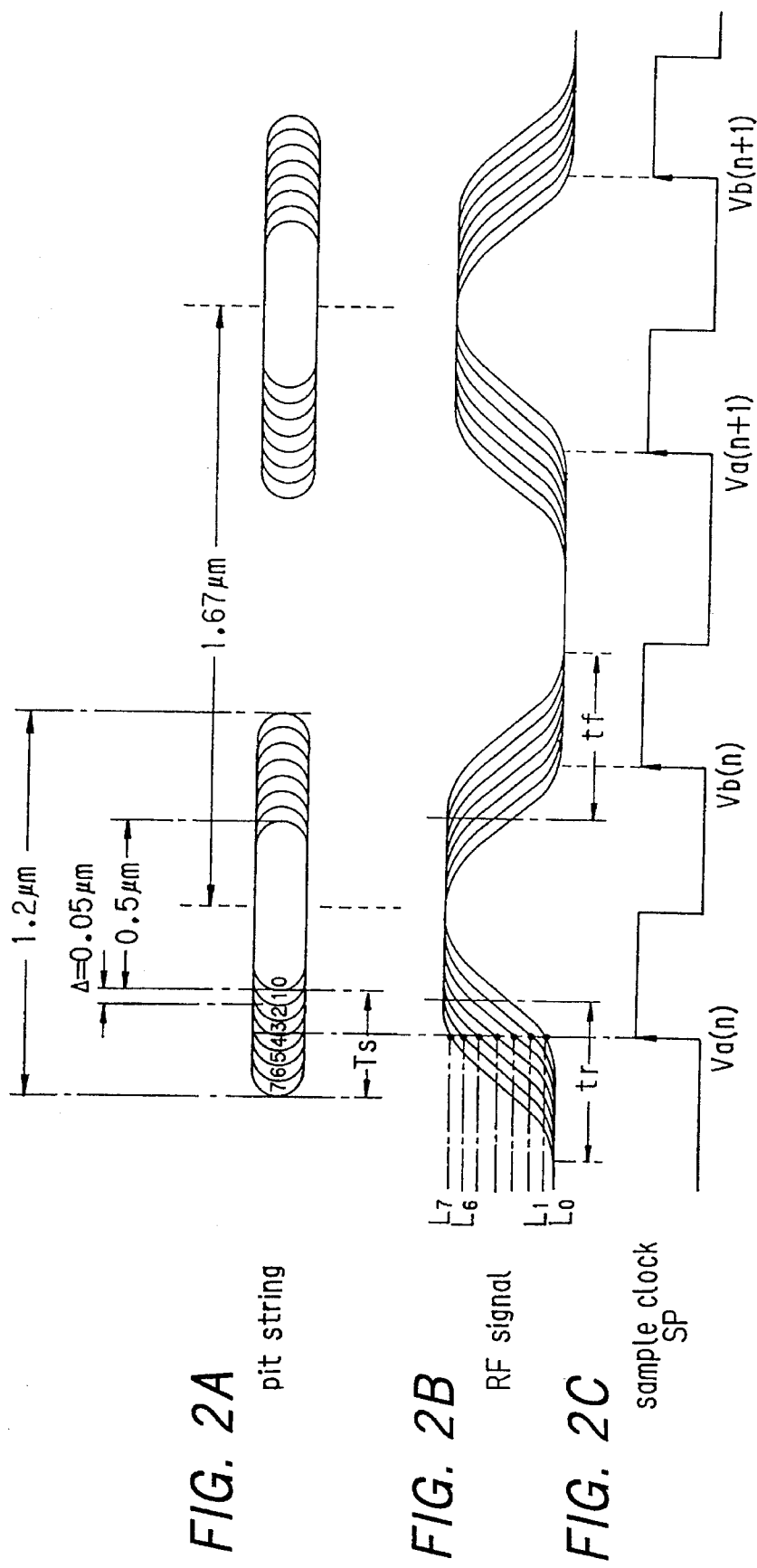
FIGS. 2A–2C are diagrams for explaining an principle of reproducing data in accordance with an embodiment of FIG. 1.

The edge modulator circuit 210 is constituted, as shown in FIG. 2, so as to generate a timing signal of a timing at which the edge positions of the front and rear edges of each pit are shifted from the reference position in the center of the pit at eight steps in accordance with digital information to be recorded. The shift period Ts of the edge position of each pit is set to fall within a range corresponding to a period smaller than a transition period (a rise period tr or a fall period tf) of the RF signal which is determined in accordance with the transfer characteristics of an optical detecting system (pickup 3) on a reproducing unit side.

The mastering unit 211 cuts a photosensitive film coated on a recording plate by application of a laser beam in synchronism with the timing signal supplied from the edge modulator circuit 210. The cut recording plate is developed, subjected to plating, thereby to produce a stamper. Subsequently, the pits formed on the stamper is transferred to a replica. The replica is then subjected to aluminum vapor deposition, and coated with a protective film, thereby to manufacture the optical disc 1.

In the above-description, a case where the present invention is applied to the optical disc and the reproducing apparatus therefor was described, however, the present invention is applicable to a photo-magnetic disc, other information recording media, and reproducing apparatuses therefor.

As was described above, in the information recording medium in accordance with the present invention, since at least one edge of the pit is located in correspondence with synchronous data in a predetermined period at a position different from that in the case of modulation by the recording data, the synchronous data can be readily detected.

In this case, because a pit always exists every constant period, the deterioration of the formability of the pit and the deformation of the pit are suppressed in comparison with a case where no pit is recorded for a long period of time or inversely a specially large pit are recorded.

Also, in the information recording medium in accordance with the invention, since the positions of the opposed edges of two adjacent pits are changed in correspondence with the synchronous data, a difference between the RF signal of the data region and the RF signal of the synchronous data can be enlarged, thereby to improve the accuracy in detection of the synchronous data. As a result, the synchronous data can be more stably detected.

Further, in the information recording medium reproducing apparatus in accordance with the invention, since the edge corresponding to the predetermined recording data is disposed at a position apart by a given distance from the edge corresponding to the synchronous data, the synchronous data can be stably detected regardless of the bias fluctuation of the recording medium by calculating a difference therebetween. As a result, a difference between the synchronous data and the recording data can be reduced, and therefore the width of change in the recording data is increased as much, thereby to enlarge the margin when demodulating.

Still further, in the information recording medium reproducing apparatus in accordance with the invention, since the timing corresponding to the edge of the synchronous pit is detected on the basis of the level corresponding to the synchronous pit and the level corresponding to the reference pit, the timing corresponding to the edge of the synchronous pit can be detected with accuracy and stability regardless of bias fluctuation of the information recording medium.

Yet still further, in the information recording medium reproducing apparatus in accordance with the invention, since the level of the synchronous pit is detected on the basis of the clock signal generated from the frequency component corresponding to a constant period of the pits, the timing corresponding to the edge of the synchronous pit can be detected with accuracy before the recording speed of the recording medium attains a regular speed.

Yet still further, in the information recording medium reproducing apparatus, since the reference value of the comparison means is controlled to be a predetermined frequency of the timing signal corresponding to the edge of the synchronous bit, even though the pits formed in the information recording medium are dispersed, the edge corresponding to the synchronous pit can be detected accurately without any adjustment.

Yet still further, in the information recording medium reproducing apparatus in accordance with the invention, a signal resulting from binary-coding a reproduced RF signal is subjected to frequency-to-voltage conversion so as to control the rotational movement of the information recording medium, the rotational speed of the information recording medium can be readily controlled to a value which is inverse-proportional to the radius of the recording medium. In this case, no sensor for obtaining radius information is necessary, thereby being capable of realizing a device at the low costs.

Yet still further, in the information recording medium reproducing apparatus in accordance with the invention, since the frequency component corresponding to a constant period of the pit is extracted from reproduced RF signal, even though a d.c. component in the reproduced signal from the information recording medium fluctuates or an asymmetric property or the like exist in the signal, the rotational speed of the information recording medium can be accurately controlled.

Yet still further, in the information recording medium reproducing apparatus in accordance with the invention, since the rotational movement of the information recording medium is controlled in accordance with a phase difference between the signal extracted from the extraction means and the reference signal, even if the frequency-to-voltage conversion characteristics are changed due to the circumferential temperature or the like, the rotational movement of the information recording medium can be controlled with accuracy.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information recording medium having a plurality of regularly spaced pits that alternate between data pits and servo pits, each pit of the plurality of regularly spaced pits having an edge located in one of a plurality of positions, wherein the position of the edge of a data pit defines user data recorded on the recording medium, and wherein an edge position of the plurality of positions available to a servo pit is unavailable to the data pits.

2. The information recording medium as claimed in claim 1, wherein the adjacent edges of two adjacent servo pits each have the edge position unavailable to the data pits.

3. The information recording medium as claimed in claim 2, wherein adjacent edges of a first two adjacent servo pits are reproduced as a first signal level, wherein adjacent edges of a second two adjacent servo pits which have the edge position unavailable to the data pits are reproduced as a second signal level, and wherein the adjacent edges of the first two adjacent servo pits are positioned a predetermined distance from the adjacent edges of the second two adjacent servo pits.

4. An information recording medium reproducing apparatus for reproducing an information recording medium having a plurality of regularly spaced pits that alternate between data pits and servo pits, each pit of the plurality of regularly spaced pits having an edge located in one of a plurality of positions, the position of the edge of a data pit defining user data recorded on the recording medium, wherein an edge position of the plurality of positions available to a servo pit is unavailable to the data pits, wherein adjacent edges of a first two adjacent servo pits are reproduced as a first signal level, and wherein adjacent edges of a second two adjacent servo pits which have the edge position unavailable to the data pits are reproduced as a second signal level, the apparatus comprising:

reproduction means for reproducing said information recording medium to form a reproduced signal;

level detection means for detecting the first and second signal levels in the reproduced signal outputted from said reproduction means; and timing detection means for detecting a timing of the detection of the first signal level and the detection of the second signal level.

5. An information recording medium reproducing apparatus for reproducing an information recording medium having a plurality of regularly spaced pits that alternate between data pits and servo pits, each pit of the plurality of regularly spaced pits having an edge located in one of a plurality of positions, the position of the edge of a data pit defining user data recorded on the recording medium, wherein an edge position of the plurality of positions available to a servo pit is unavailable to the data pits, wherein adjacent edges of two adjacent servo pits which have the edge position unavailable to the data pits are reproduced with a synchronous pit signal level, the apparatus comprising:

reproduction means for reproducing said information recording medium to form a reproduced signal;

generation means for extracting a frequency from the reproduced signal outputted from said reproduction means, for comparing a level of the frequency to a predetermined level, and for generating a clock signal that changes states when the level of the frequency rises above and falls below the predetermined level;

level detection means for detecting the synchronous pit signal level in the reproduced signal in response to the clock signal generated by said generation means; and timing detection means for detecting a timing of the detection the synchronous pit signal level.

6. An information recording medium reproducing apparatus for reproducing an information recording medium having a plurality of regularly spaced pits that alternate between data pits and servo pits, each pit of the plurality of regularly spaced pits having an edge located in one of a plurality of positions, the position of the edge of a data pit defining user data recorded on the recording medium, wherein an edge position of the plurality of positions available to a servo pit is unavailable to the data pits, wherein adjacent edges of two adjacent servo pits which have the edge position unavailable to the data pits are reproduced with a synchronous pit signal level, the apparatus comprising:

reproduction means for reproducing said information recording medium to form a reproduced signal;

level detection means for detecting the synchronous pit signal level in the reproduced signal outputted from said reproduction means;

comparator means for comparing the synchronous pit signal level detected by said level detection means with a predetermined reference value to output a timing signal; and control means for controlling the predetermined reference value of said comparator means so that a frequency of the timing signal is set to a predetermined frequency.

7. The information recording medium reproducing apparatus as claimed in claim 4, and further comprising:

binary coding means for binary coding the reproduced signal outputted from said reproduction means;

frequency-to-voltage conversion means for subjecting an output of said binary coding means to frequency-to-voltage conversion; and rotation control means for controlling the rotational movement of said information recording medium so that an output of said frequency-to-voltage conversion means is set to a predetermined value.

8. The information recording medium reproducing apparatus as claimed in claim 7, and further comprising extraction means for extracting a frequency component corresponding to a constant period of said pits from a reproduced RF signal outputted from said reproduction means to output said frequency component to said binary coding means.

9. The information recording medium reproducing apparatus as claimed in claim 8, and further comprising phase comparison means for comparing a phase of a signal outputted from said extraction means with a phase of a predetermined reference signal to output a signal for controlling the rotational movement of said information recording medium according to a comparison result.

10. The information recording medium reproducing apparatus as claimed in claim 5 and further comprising:

binary coding means for binary coding the reproduced signal outputted from said reproduction means;

frequency-to-voltage conversion means for subjecting an output of said binary coding means to frequency-to-voltage conversion; and rotation control means for controlling the rotational movement of said information recording medium so that an output of said frequency-to-voltage conversion means is set to a predetermined value.

11. The information recording medium reproducing apparatus as claimed in claim 10, and further comprising extraction means for extracting a frequency component corresponding to a constant period of said pits from a reproduced RF signal outputted from said reproduction means to output said frequency component to said binary coding means.

12. The information recording medium reproducing apparatus as claimed in claim 11, and further comprising phase comparison means for comparing a phase of a signal outputted from said extraction means with a phase of a predetermined reference signal to output a signal for controlling the rotational movement of said information recording medium according to a comparison result.

13. The information recording medium reproducing apparatus as claimed in claim 6 and further comprising:

binary coding means for binary coding the reproduced signal outputted from said reproduction means;

frequency-to-voltage conversion means for subjecting an output of said binary coding means to frequency-to-voltage conversion; and rotation control means for controlling the rotational movement of said information recording medium so that an output of said frequency-to-voltage conversion means is set to a predetermined value.

14. The information recording medium reproducing apparatus as claimed in claim 13, and further comprising extraction means for extracting a frequency component corresponding to a constant period of said pits from a reproduced RF signal outputted from said reproduction means to output said frequency component to said binary coding means.

15. The information recording medium reproducing apparatus as claimed in claim 14, and further comprising phase comparison means for comparing a phase of a signal outputted from said extraction means with a phase of a predetermined reference signal to output a signal for controlling the rotational movement of said information recording medium according to a comparison result.

16. The information recording medium as claimed in claim 1, wherein adjacent edges of a first two adjacent servo pits are reproduced as a first signal level, wherein adjacent edges of a second two adjacent servo pits which have the edge position unavailable to the data pits are reproduced as a second signal level, and wherein the adjacent edges of the first two adjacent servo pits are positioned a predetermined distance from the adjacent edges of the second two adjacent servo pits.

* * * * *